US011316777B2

(12) United States Patent
Brissette et al.

(10) Patent No.: US 11,316,777 B2
(45) Date of Patent: Apr. 26, 2022

(54) METHOD AND SYSTEM FOR NETWORK TRAFFIC DIVERSION

(71) Applicant: CISCO TECHNOLOGY, INC., San Jose, CA (US)

(72) Inventors: Patrice Brissette, Gatineau (CA); Luc Andre Burdet, Gatineau (CA); Jiri Chaloupka, San Jose, CA (US); Mei Zhang, Cary, NC (US); Tarek Saad, Nepean (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 179 days.

(21) Appl. No.: 16/686,896

(22) Filed: Nov. 18, 2019

(65) Prior Publication Data

US 2021/0152464 A1    May 20, 2021

(51) Int. Cl.
*H04L 12/707* (2013.01)
*H04L 45/00* (2022.01)
*H04L 45/50* (2022.01)
*H04L 45/28* (2022.01)

(52) U.S. Cl.
CPC ........... *H04L 45/22* (2013.01); *H04L 45/28* (2013.01); *H04L 45/50* (2013.01)

(58) Field of Classification Search
CPC ......... H04L 45/22; H04L 45/28; H04L 45/50; H04L 45/0654; H04L 45/0659
See application file for complete search history.

(56) References Cited

U.S. PATENT DOCUMENTS

| | | | |
|---|---|---|---|
| 2017/0141963 A1* | 5/2017 | Chalapathy | H04L 12/4641 |
| 2017/0339052 A1* | 11/2017 | Arora | H04L 45/66 |
| 2019/0013966 A1* | 1/2019 | Nagarajan | H04L 12/185 |
| 2019/0245779 A1* | 8/2019 | Jonnalagadda | H04L 12/4641 |

OTHER PUBLICATIONS

Filsfils, Clarence, et al., "BGP Prefix Independent Convergence (PIC) Technical Report", Nov. 2007, pp. 1-14.
Murali, Sudarshan, et al., "EVPN Unifying Control Plane", Cisco Systems; Apr. 6, 2018; 46 pages.
Shen, Y. et al., "MPLS Egress Protection Framework"; draft-ietf-mpls-egress-proction-framework-04; Internet Engineering Task Force; Internet—Draft; Jan. 2, 2019; 29 pages.

* cited by examiner

*Primary Examiner* — Donald L Mills

(57) ABSTRACT

A method, network device, and computer program product for network traffic diversion are disclosed. In one embodiment, a method according to the present disclosure includes receiving a frame at a core edge node that is a member of a redundancy group (where the frame comprises network address information and a packet), and determining whether a link (to which the core edge node is communicatively coupled) is affected by a network failure. The frame was sourced by a remote core edge node that is not a member of the redundancy group, and the network address information indicates that the packet is to be forwarded via the link. In response to the link being affected by the network failure, the method further includes generating a modified frame and forwarding the modified frame to another core edge node. The generating comprises including a redirect label in the modified frame. The another core edge node is another member of the redundancy group.

20 Claims, 18 Drawing Sheets

METHOD AND SYSTEM FOR NETWORK TRAFFIC DIVERSION

TECHNICAL FIELD

The present disclosure relates generally to network communications, and more particularly methods and systems for network traffic diversion.

BACKGROUND

Communication networks allow network clients, such as computer systems, to exchange data with each other at ever-increasing speeds. Communication protocols define the techniques and formats that such devices use when exchanging data via the communication networks. Communication networks connect the devices over various media, such as optical, electrical, or wireless media, and/or a combination thereof. Further, such a network can include network devices that facilitate such communication. These network devices (such as switches, routers, and the like) provide, for example, routing functionality that can route data (e.g., carried in packets, datagrams, frames, or the like) from one point in the communications network to another, possibly within a larger communication network.

BRIEF DESCRIPTION OF THE DRAWINGS

The present disclosure may be better understood, and its numerous objects, features, and advantages made apparent to those skilled in the art by referencing the accompanying drawings.

Figure 1:
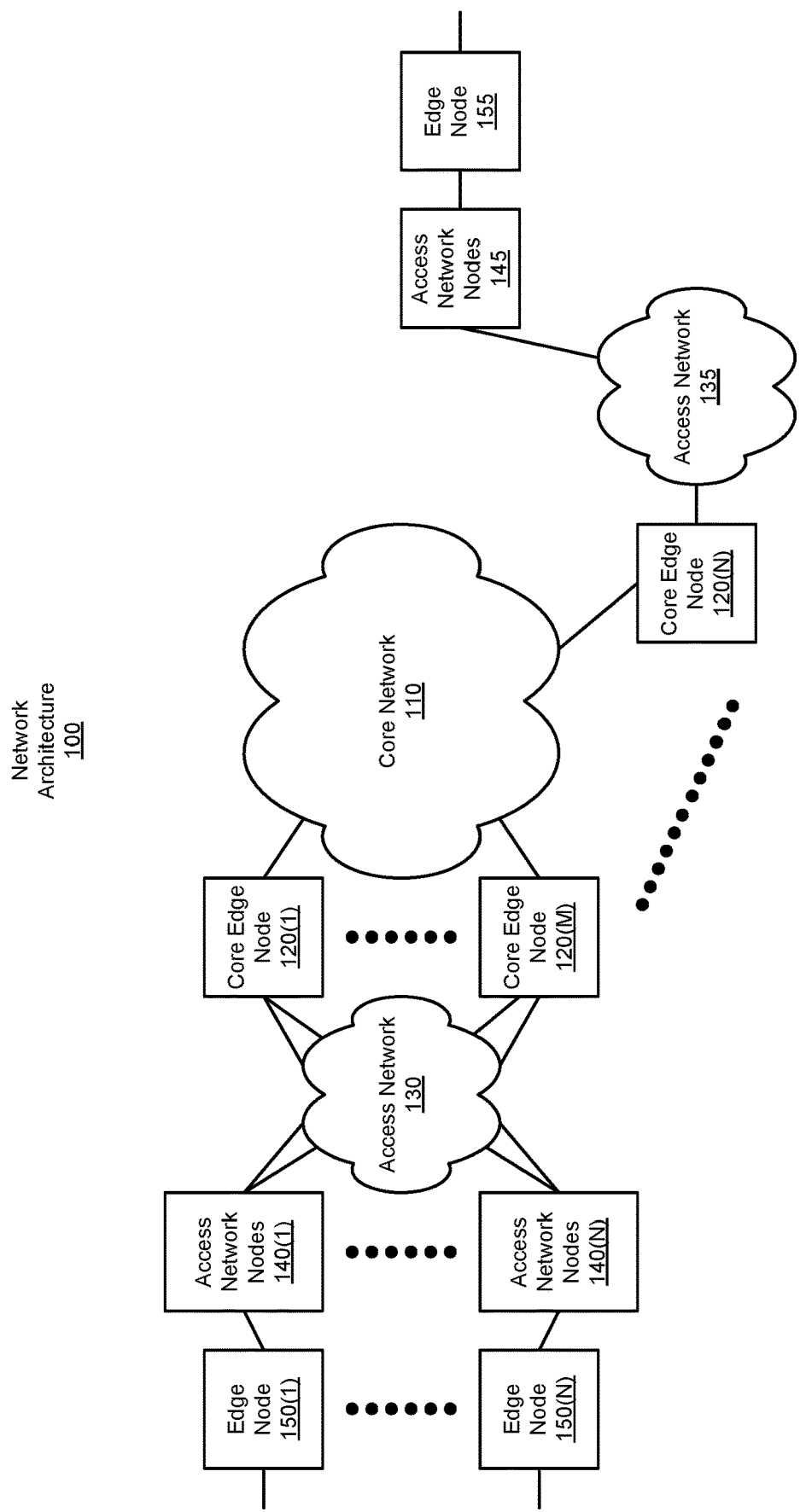
FIG. 1 is a block diagram illustrating an example of a simplified network architecture, according to one embodiment.

While embodiments such as those presented in the application are susceptible to various modifications and alternative forms, specific embodiments are provided as examples in the drawings and description of example embodiments. It should be understood that the drawings and description of example embodiments are not intended to limit the embodiments to the particular form disclosed. Instead, the intention is to cover all modifications, equivalents and alternatives falling within the spirit and scope of methods and systems such as those described herein, as defined by the appended claims.

DESCRIPTION OF EXAMPLE EMBODIMENTS

Overview

Methods and systems such as those described herein can be implemented, for example, as a method, network device, and/or computer program product, and provide for the diversion of network traffic in response to a network failure. Such a method can include, for example, receiving a frame at a core edge node that is a member of a redundancy group (where the frame comprises network address information and a packet), and determining whether a link (to which the core edge node is communicatively coupled) is affected by a network failure. The frame was sourced by a remote core edge node that is not a member of the redundancy group, and the network address information indicates that the packet is to be forwarded via the link. In response to the link being affected by the network failure, the method further includes generating a modified frame and forwarding the modified frame to another core edge node. The generating comprises including a redirect label in the modified frame. The another core edge node is another member of the redundancy group.

EXAMPLE EMBODIMENTS

Methods and systems such as those described herein provide for the diversion (the redirection and, if necessary, bypassing of blocking) of network traffic in response to, for example, a network failure (topology change, or other such event). By configuring the core edge network devices within a redundancy group (the redundancy group's member nodes) to provide a core edge network device in that redundancy group with information that can be subsequently included in frames sent to another core edge network device in the redundancy group, such implementations provide the core edge network device in question with the ability to indicate to other core edge network devices that information (e.g. a packet) within the frame should be forwarded thereby, despite the core edge network device's status (or that of one or more of its ports/links, e.g.) in the redundancy group. In so doing, network traffic forwarded in this manner can be quickly and efficiently redirected, and forwarded to its ultimate destination.

Methods and systems such as those described herein are directed to addressing the need for fast, efficient network traffic failover in an Ethernet virtual private network (VPN) (EVPN). An EVPN network allows local customer edge (CE) devices to communicate with remote CE devices by way of connection to one or more provider edge (PE) nodes (e.g., a router or other network device) of a provider core network (or more simply, a core network). Such PE nodes can, for example, be implemented using a Multi-Protocol Label Switching (MPLS) device that acts at the edge of the core network's MPLS infrastructure. In certain EVPN architectures, CE devices are communicatively coupled to such PE nodes by one or more access network nodes of an access network, interposed between the CE devices and their respective PE nodes.

In order to provide increased reliability in such architectures, multi-homing techniques are employed. A multi-homed redundancy group (e.g., connecting, for example, a customer network to multiple core edge nodes by way of an access network) provides redundancy in a multi-homed access network by providing CE devices (and/or the appropriate access network nodes) with multiple connections to the core network by way of network communications with multiple core edge nodes. In the event of a lack of connectivity to one core edge node in the redundancy group (due to failure in the access network, intentional change in topology, or the like), network communications can be rerouted dynamically through another of the redundancy group's core edge nodes. To avoid the transmission of duplicate packets (and, potentially, forwarding loops), a selected core edge network node can be made responsible for forwarding such network traffic, while other core edge network nodes can be configured to avoid performing such forwarding operations. In one implementation, this is effected by one of the redundancy group's member nodes (one of the PE nodes in the redundancy group) being elected as the redundancy group's designated forwarder (DF), and more particularly, by a given link of the PE node in question being placed in the DF state. In certain embodiments, such election is on a per-link basis, and so links may be referred to as being in a DF state or a non-DF state (thus leading to the possibility of various links to which a given node is communicatively coupled (and so interfaces of that node) being in the DF state, while various other of such links (interfaces) are in the non-DF state). At points herein, however, a given PE node will be discussed in terms of being a DF node, for ease of discussion, it being understood that such designation is intended to represent the given PE node's being so designated in view of the type of network traffic, and so, the scope of that traffic (e.g., on a per Ethernet Segment (ES) basis, a per EVPN Instance (EVI) basis, or other such basis of scope), as well as with respect to network layers, network groupings, and the like.

A designated forwarder (DF) is responsible for conveying network traffic to a multi-homed customer equipment (CE) device in a given VLAN on a particular Ethernet Segment (ES, identified by an ES identifier (ESI)) or EVPN Instance (EVI). For example, a DF is responsible for forwarding network traffic, received from the core network, to the access network, and, ultimately, to the appropriate customer edge (CE) device. Such network traffic can be sourced (originally sent) by a remote PE (a PE not in the redundancy group), and, in various embodiments, is flooded by the remote PE (e.g., in the case of broadcast/unknown unicast/multicast (BUM) network traffic; to the edge nodes within, for example, the given layer 2 flood domain) or sent specifically to the given PE by the remote PE (e.g., as in the case of known unicast network traffic (or more simply, unicast network traffic), the distinction between "known" and "unknown" being with regard to whether the network traffic's destination address is known or unknown by the forwarding node (e.g., as a result of the destination's not being in the forwarding information base)).

Once a set of multi-homed PE peers (which form a redundancy group) have discovered one another, a PE is elected as the DF for the ES or EVI. The remaining PEs are non-DFs (NDFs). Each NDF can be configured to, for example, block BUM traffic received from the core destined for the CE device by, for example, dropping such traffic. In certain implementations, the DF election process selects a DF from a list of candidate PEs. Such PEs can be, for example, those PEs that advertise the same Ethernet Segment Identifier (ESI) to the core network. This selection process takes place in the control plane of the core network, and can take a relatively long period of time to converge (i.e., complete the process of electing a DF (or a new DF, in the case of a failure), also referred to herein as an election process), which can be on the order of seconds. For example, a DF election can be triggered by the withdrawal of a Route Type of 4 (a Route Type of Ethernet Segment Route), which will need to propagate through the core network to trigger the process.

There are a number of multi-homing modes available in EVPN. Two potential alternatives are all-active redundancy and single-active redundancy. In using an all-active redundancy mode, a network device (or network) is multi-homed to a group of two or more PEs, and all PEs belonging to such a redundancy group can forward network traffic to/from the multi-homed network device (or network) for a given VLAN. In using a single-active redundancy mode, a network device (or network) is multi-homed to a group of two or more PEs, and only a single PE in such a redundancy group can forward traffic to/from the multi-homed network device (or network) for a given VLAN (and is referred to as the aforementioned DF).

In using a single-active EVPN multi-homing mode (where only one core edge node in a redundancy group is active at a time) network communication paths through the core network are controlled by the DF election process, which uses functionalities provided by the core network to avoid the creation of loops in the access networks communicatively coupled thereto. In using a single-active redundancy mode, a network device (or network) is multi-homed to a group of two or more core edge nodes, and only a single core edge node in such a redundancy group can forward traffic to/from the multi-homed network device (or network) for a given virtual local area network (VLAN; a VLAN basically being a construct that allows for the logical segregation of networks without physically segregating them with various switches, while a VPN is used to connect two networks using a tunnel). Thus, in the case of single-active redundancy mode, the challenge is that, based on the designated forwarder (DF) election, only one of the core edge nodes will be forwarding traffic from access network to the core network, and vice versa (e.g., for a given Ethernet Segment of a VPN). A designated forwarder (DF) can be used when customer edge devices (CEs) are multi-homed to more than one provider edge (PE) device (core edge node). Without a designated forwarder or similar construct in a single-active scenario, multi-homed hosts could receive duplicate packets, as the result of loops and multiple paths.

Designated forwarders in single-active scenarios can be chosen for an Ethernet Segment identifier (ESI) based on route advertisements.

In using an all-active redundancy mode, a network device (or network) is multi-homed to a group of two or more core edge nodes, with all (or at least, more than one) of the core edge nodes belonging to such a redundancy group forwarding network traffic to/from the multi-homed network device (or network) for a given VLAN (at least with regard to known unicast traffic; for broadcast/unknown unicast/multicast (BUM) network traffic, the non-DF PE(s) drop such BUM traffic traveling from the core into the access network). Such an approach allows for load-balancing among the core edge nodes in the redundancy group. With regard to embodiments such as those described herein, it will be appreciated that, with respect to the EVPN mode, implementations comprehended by such embodiments include the load-balancing modes of each of those EVPN modes.

While such a single-active redundancy mode provides mechanisms to handle failures in the access network communicatively coupled to the members of the given redundancy group, the process of reacting to such a failure by failing over from the current DF core edge node in a redundancy group, to a peer core edge node in the redundancy group (a non-DF core edge node) can involve relatively long periods of time.

For example, a gateway protocol (e.g., such as an interior gateway protocol (IGP)) can be employed by a border gateway protocol (e.g., BGP) to determine the cost (or desirability, in view of the parameters used in determining such a metric) of a given route within a network, as between the PEs of a redundancy group and a remote PE. This is because the DF election procedures, which are triggered by other gateway protocol exchanges (e.g., border gateway protocol (BGP) exchanges), are independent of the IGP path calculations. That being the case, the time involved in performing such exchanges can be, in relative terms, fairly long, whether such exchanges are performed in the initial identification of a redundancy group's DF, or in response to a failure, topology change, or the like.

By way of further example, in the event of a failure affecting such a DF's ability to communicate network traffic to the appropriate access network node (e.g., the failure of the link in the DF state, thereby preventing the PE's communication by way of that link), the DF PE will detect the failure and initiate the process of electing another of its peer PEs as the redundancy group's new DF. As will be appreciated, this process entails network communications with other core nodes, in the control plane, the convergence of which can entail a relatively long period of time (e.g., on the order of seconds, as noted).

In certain applications, the network traffic over a given network path (e.g., packets conveyed in the core network's frames) cannot suffer a failure resulting in a loss of connection lasting over 50 milliseconds (50 ms). As will be appreciated, core network convergence for DF election can require an unacceptably long period of time in the event of a failure necessitating the election of a new DF.

The approaches described herein address such situations by redirecting affected network traffic from its intended path through a given edge node (e.g., a redundancy group's current DF) through another PE of the redundancy group (e.g., via a link that is originally NDF). By performing such network traffic redirection, the affected network traffic is passed through an edge node with a link (e.g., that may be currently DF, but failed), and sent to the appropriate peer edge node (though its link in this regard may be NDF). To accomplish such fast rerouting of network traffic, the current DF includes information (provided earlier by the non-DF) in the frames forwarded to the non-DF. When the non-DF receives frames including such information, the non-DF forwards the packets contained therein to the multi-homed access network node supported by the redundancy group. As will be appreciated in light of present disclosure, such forwarding (having been identified by the aforementioned information) occurs despite the given PE's non-DF status (and the blocking that would otherwise occur), and so bypasses the blocking that would otherwise serve to prevent the forwarding of duplicate packets. In so doing, procedures such as those described herein provide for quickly rerouting network communications through a designated forwarder to a non-designated forwarder in the given redundancy group, and so, allow such network communications to proceed through the core network to the local access network in question, with minimal disruption, as described subsequently.

Example Network Topologies

FIG. 1 is a block diagram illustrating an example of a simplified network architecture, according to one embodiment. To this end, FIG. 1 depicts a network architecture 100, which supports network communications between a number of network devices via a core network (depicted in FIG. 1 as a core network 110). Core network 110 is accessed via a number of core edge nodes (depicted in FIG. 1 as core edge nodes 120(1)-(N), referred to collectively as core edge nodes 120). Core edge nodes 120 are, in turn, communicatively coupled to one or more access networks (depicted in FIG. 1 as access networks 130 and 135), which facilitate network communications through core network 110 by managing access to core network 110, as well as communications with networks/network devices communicatively coupled thereto, encapsulating network traffic received from such access network devices and decapsulating network communication destined to such access network devices. In the example depicted in FIG. 1, various local networks/network devices (not shown) communicate with access networks 130 and 135 (and so, via core network 110, with one another) via one or more access network nodes (depicted in FIG. 1 as access network nodes 140(1)-(N) and 145), to which the local networks/network devices are communicatively coupled via edge nodes (depicted in FIG. 1 as edge nodes 150(1)-(N) and 155). In this regard, while edge nodes 150(1)-(N) and 155 are shown in FIG. 1 as being communicatively coupled to corresponding ones of access network nodes 140(1)-(N) and 145, such need not (and may well not) be the case. As will be appreciated in light of the present disclosure, in any given network topology, more than one of edge nodes 150(1)-(N) may be communicatively coupled to one of access network nodes 140(1)-(N). Further, it will also be appreciated that, by operation of access network 150 and core edge nodes 120(1)-(M), more than one of access network nodes 140(1)-(N) can be logically coupled to one of core edge nodes 120(1)-(M), as is demonstrated in certain of the subsequent figures.

Figure 2:
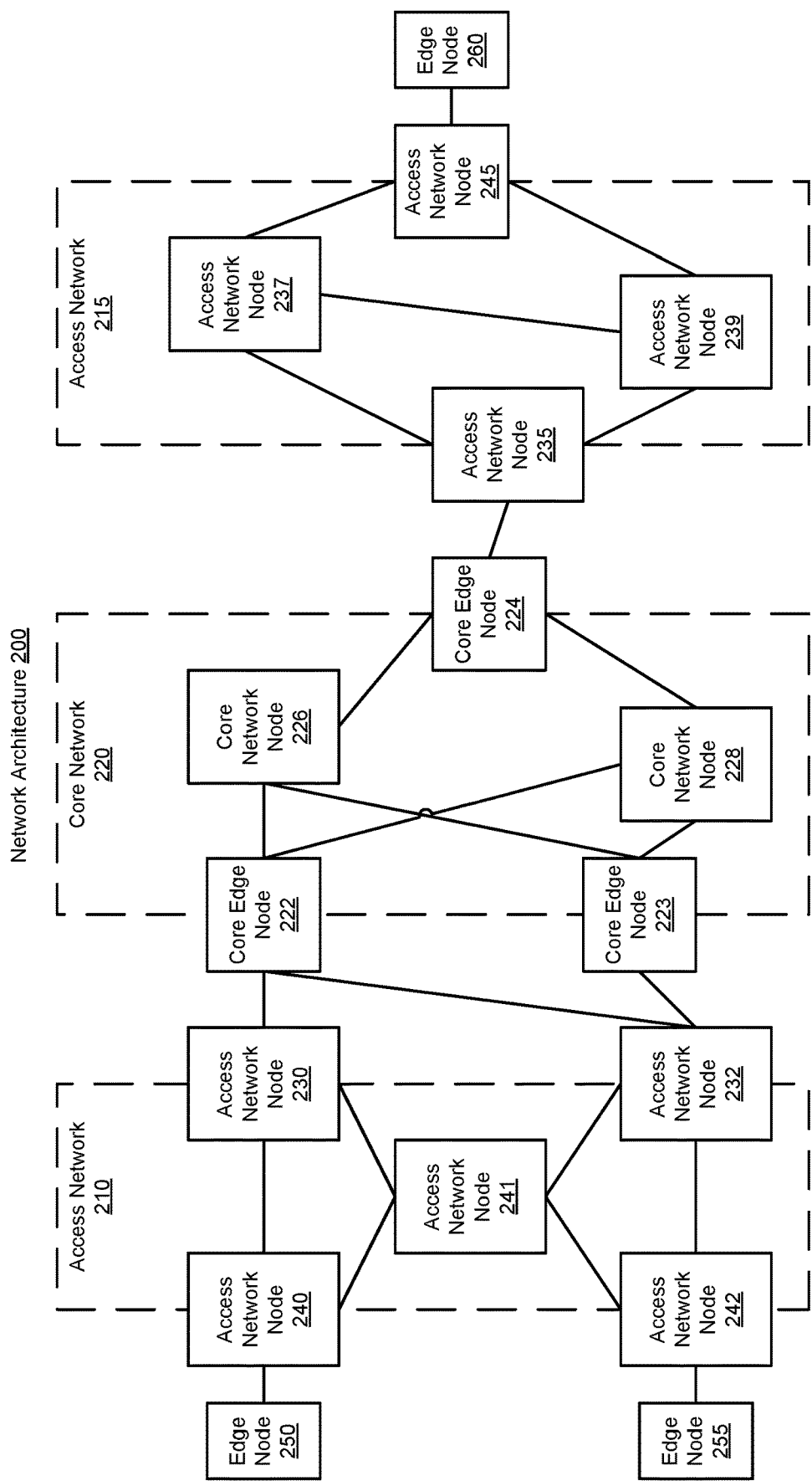
FIG. 2 is a block diagram illustrating an example of a simplified network architecture, according to one embodiment.

FIG. 2 is a block diagram illustrating an example of a simplified network architecture, according to one embodiment. FIG. 2 provides additional detail as to examples of network nodes and possible connections therebetween, and so depicts a network architecture 200 in which an access network 210 and an access network 215 are communicatively coupled to one another by way of a core network 220. In the manner noted with regard to FIG. 1, network architecture 200 illustrates the logical connections between the networking devices depicted in FIG. 2. Thus, core network 220 includes a number of core edge nodes (depicted in FIG. 2 as core edge nodes 222, 223, and 224), and further includes one or more core network nodes (depicted in FIG. 2 as core network nodes 226 and 228), which are internal to core network 220. As noted, connections between ones of the core edge nodes and core network nodes of core network 220 depicted in FIG. 2 are logical in nature, and so can represent direct connections, connections via other nodes of core network 220, taken singly or in combination. Thus, the logical connections depicted in FIG. 2 within core network 220 are merely examples of such possible connections. Further, as will be appreciated in light of the present disclosure, core network 220 can include a variety of such nodes, both in interconnections and combination.

In turn, access networks 210 and 215 include access network nodes 230, 232, 235, 237, 239, 240, 241, 242, and 245, with access network 210 including access network nodes 230, 232, 240, 241, and 242, and access network 215 includes access network nodes 235, 237, 239, and 245. As with core network 220, the examples presented by access networks 210 and 215 can (and typically will) include additional internal nodes. Examples of such internal nodes are depicted in FIG. 2 as access network nodes 237, 239, and 241. Core network 220 is communicatively coupled to access networks 210 and 215 at core edge nodes 222 and 223, and core edge node 224, respectively. In this regard, core edge nodes 222 and 223 are communicatively coupled variously to access network nodes 240 and 242, while core edge node 224 is communicatively coupled to access network node 245. Here again, access network 210 (and so too, access network 215) can, and typically will include a number of access network nodes and/or access network nodes (which, in fact, need not differ from one another), communicatively coupled to one another in various ways.

Network communications between local network/network devices are supported via access networks 210 and 215, and core network 220 at various points within access networks 210 and 215. For example, with respect to access network 210, local network/network devices are communicatively coupled to access network 210 by way of edge nodes 250 and 255 (which are communicatively coupled to access network nodes 240 and 242, respectively), while other local networks/network devices are communicatively coupled to access network 215 by way of an edge node 260 (which is communicatively coupled access network node 245). In being structured in such a fashion, such an access network can support one or more logical connections. Examples of such logical connections can be effected, for example, by what is referred to as a virtual private network (VPN).

In one embodiment, a network architecture such as network architecture 200 is implemented using an approach that employs Ethernet VPN (EVPN) techniques to facilitate network communications in core network 220 (e.g., a VPN supported between customer edge nodes (e.g., edge nodes 250 and 260) that traverse core network 220 via core edge nodes 222 and 224). Such an implementation can employ a scalable multi-protocol label switching (MPLS) protocol in supporting Layer 2 (of the Open Systems Interconnect model) VPN services by way of a multi-protocol border gateway protocol (BGP). Embodiments such as those described herein can, for example, use EVPN to aggregate internet protocol (IP) access networks over an MPLS core network, while offering Layer 2 VPN services in an end-to-end fashion. A network topology such as that depicted in FIG. 2 can be characterized as including three domains: a customer network (e.g., the edges of which could be edge nodes 250, 255, and 260), an IP access network (e.g., access networks 210 and 215), and an MPLS network (e.g., core network 220).

In such an embodiment, a customer network (e.g., by way of a customer edge (CE) device, as noted) connects to the access network in question (e.g., an internet protocol (IP) access network such as, in certain embodiments, access network 210) via a customer edge (CE) device (e.g., edge nodes 250 and 255). As noted, access network 210 includes not only one or more access network nodes (also referred to herein as ANs) to which such CEs are communicatively coupled (e.g., access network nodes 240 and 242), but also IP core nodes (IPc, such as access network nodes 237, 239, and 241). The ANs perform tunneling of Ethernet packets using an IP tunneling mechanism. Such a core network (e.g., an MPLS network, as in this example) can include provider edge nodes (PEs, such as core edge nodes 222, 223, and 224), as well as MPLS core nodes (P, such as core network nodes 226 and 228). The PEs terminate the IP tunnels which originate from the ANs in their local IP access network (and thus form the aforementioned end-to-end (CE-to-CE) connections). Preferably, in an embodiment such as that just described, support for multipoint Layer 2 VPN services is provided that supports end-to-end (i.e. CE-to-CE) network communications, as noted. Also preferably, support for IP as well as non-IP payloads is provided (thus, "multi-protocol").

Figure 3:
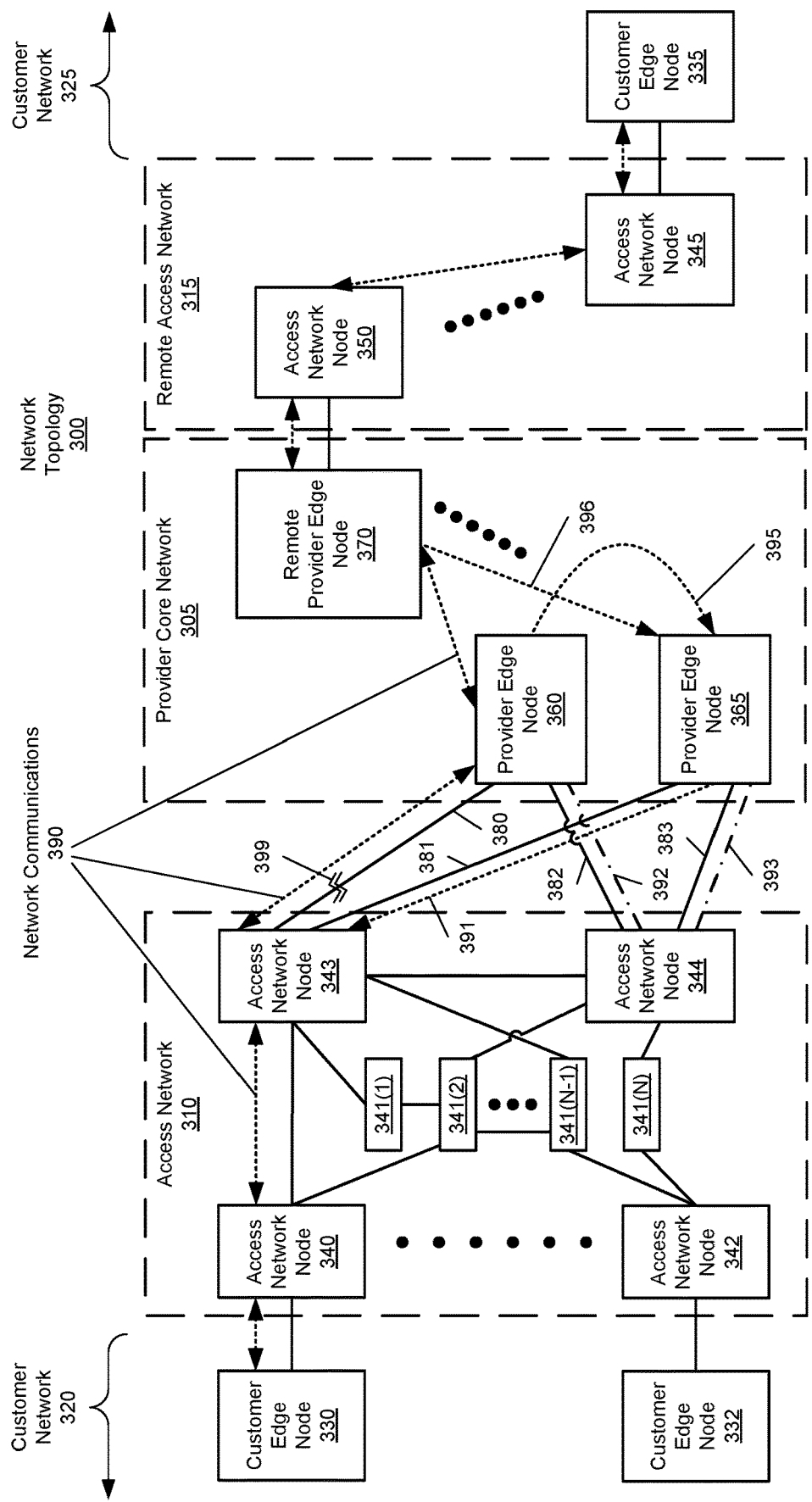
FIG. 3 is a block diagram illustrating an example of a simplified network topology, according to one embodiment.

FIG. 3 is a block diagram illustrating an example of a simplified network topology, according to one embodiment. FIG. 3 thus depicts a network topology 300, which is more conceptual in nature than the block diagrams of FIGS. 1 and 2. Network topology 300 is similar in form to network architecture 200 of FIG. 2, but illustrates an example of a more specific application of the inventive concepts described herein. That being the case, network topology 300 includes a core network (depicted in FIG. 3 as a provider core network 305), which couples two access networks (depicted in FIG. 3 as an access network 310 and remote access network 315). In a manner such as that described earlier, local networks/network devices (examples of which are depicted in FIG. 3 as customer networks 320 and 325) are able to communicate with one another via provider core network 305 and access networks 310 and 315. It will be appreciated that, as used above, the relative terms "local" and "remote" are with respect to customer network 320.

As part of customer network 320, customer edge nodes (depicted in FIG. 3 as customer edge nodes 330 and 332) couple network devices within customer network 320 with access network 310. Similarly, network devices in customer network 325 are communicatively coupled to remote access network 315 by a customer edge node 335. In support of network communications between the network devices of customer network 320 and provider core network 305, access network 310 includes access network nodes 340, 341(1)-(N), 342, 343 and 344. Similarly, the network devices of customer network 325 are communicatively coupled via customer edge node 335 to remote access 315 at an access network node 345.

Network topology 300 is, as noted, a logical representation of the communications and network devices that logically support network communications between network devices of customer networks 320 and 325. As will be appreciated in light of the present disclosure, then, the depiction of network topology 300 in FIG. 3 reflects only those elements salient to the present discussion. As will also be appreciated in light of the present disclosure, numerous and varied other communication paths, connect, network devices and other such elements are included in customer networks 320 and 325, access networks 310 and 315, and provider core network 305.

To this end, remote access network 315 includes one or more access network nodes (e.g., of which an access network node 350 is an example), which serve as examples of other such network devices in remote access network 315. In support of the aforementioned network communications, provider core network 305 includes a number of provider edge nodes (depicted in FIG. 3 as provider edge nodes 360 and 365, and a remote provider edge node 370). As noted earlier, provider core network 305 will, typically, include more network devices than simply the three provider edge nodes depicted in FIG. 3, and will also typically include a number of core network nodes internal to provider core network 305.

Also depicted in FIG. 3 are network connections between access network node 343, and provider edge nodes 360 and 365. Such network connections can convey network communications, for example, from customer edge node 330 to access network node 343 via access network node 340, and possibly one or more other access network nodes (e.g., one or more of access network nodes 341(1)-(N)). An example of network communications between access network node 343 and provider edge node 360 is depicted in FIG. 3 as being conducted over a network communication path 380. Similarly, an example of network communications between access network node 343 and provider edge node 365 is depicted as being conducted over a network communication path 381.

In comparable fashion, network connections between access network node 344 and provider edge nodes 360 and 365 are also shown. Here again, such network communications can be conveyed, for example, from customer edge node 332 to access network node 344 via access network node 342, and possibly one or more other access network nodes (e.g., one or more of access network nodes 341(1)-(N)). An example of network communications between access network node 344 and provider edge node 360 is depicted in FIG. 3 as being conducted over a network communication path 382. Similarly, an example of network communications between access network node 344 and provider edge node 365 are depicted as being conducted over a network communication path 383. As will be appreciated in light of the present disclosure, network communication paths 380, 381, 382, and 383 represent logical connections between access network nodes 340 and 342, and provider edge nodes 360 and 365, respectively, and as such, are supported by physical network connections.

In the example presented in FIG. 3, the network communications paths (e.g., network communications paths 380 and 381, and network communications paths 382 and 383) can be treated as being included in corresponding network segments (e.g., such as corresponding Ethernet Segments). Such core edge nodes (e.g., provider edge nodes 360 and 365) participate in network communications with one or more access network nodes. Thus, network communications paths 380 and 381 can provide connectivity for one Ethernet Segment, and network communications paths 382 and 383 can provide connectivity for another Ethernet Segment. In so doing, provider edge nodes 360 and 365 are therefore able to convey network communications to and from network devices in access network 310 by way of such connectivity. As will be appreciated, access network nodes 343 and 344 being multi-homed to provider edge nodes 360 and 365 facilitates resilience in the network communications that traverse these nodes (whether sent to a specific edge node in a redundancy group (e.g., as for unicast network traffic), or flooded (e.g., as for BUM network traffic), for forwarding by the redundancy group's designated forwarder).

In the example presented in connection with FIG. 3, network traffic from customer network 320 is delivered to provider edge nodes 360 and 365 by access network 310. The provider edge node in question (e.g., provider edge node 360 or 365) encapsulate the network traffic (one or more packets) into one or more frames by prepending a frame header and other information (e.g., one or more labels), and appending a frame trailer. Such operations can include, for example, MPLS encapsulation (e.g., an MPLS label stack and other header information), as well as VPN or EVI information. The provider edge node then forwards the encapsulated packets towards the destination remote core edge node (e.g., a remote core edge node such as remote provider edge node 370) as a frame.

For network traffic in the reverse direction, remote provider edge node 370 forwards network traffic to provider edge node 360 in a comparable fashion (e.g., by prepending information such as VPN information (e.g., a VPN label) and MPLS information (e.g., an MPLS label stack and other header information)). It will be appreciated that, in the context of a core network such as provider core network 305, a core edge node that is deemed "remote" in a given situation (e.g., remote provider edge node 370) is, on a fundamental level, simply a core edge node that is not a member of the redundancy group in question (though, in fact, to be relevant, such a core edge node will provide connectivity to a "remote" access network (and so, customer edge nodes and hosts/servers communicatively coupled thereto) participating in the given VPN). Examples of such encapsulation are described in connection with FIG. 5, subsequently.

FIG. 3 also depicts network communications (e.g., depicted in FIG. 3, by dotted lines, as network communications 390, 391, 392, and 393) that represent the conveyance of network traffic between customer edge nodes 330 and 332, and provider edge nodes 360 and 365. In a more specific example, network communications 390 between customer edge nodes 330 and 335 are conveyed via access networks 310 and 315, to provider edge node 360 and remote provider edge node 370, respectively. Such communications are conveyed between provider edge node 360 and remote provider edge node 370 by provider core network 305. In the scenario depicted in FIG. 3, network communications 390 are conveyed via provider edge node 360. In the example depicted in FIG. 3, such network communications can be, for example, unicast network traffic from customer edge node 335, or BUM traffic therefrom (where provider edge node 360 has been elected as DF for the redundancy group of provider edge nodes 360 and 365), where BUM traffic sent by remote provider edge node 370 is represented (at least in part) by network paths 390 and 396. In view of access network node 343 being communicatively coupled to provider edge node 360 (by network communication path 380) and provider edge node 365 (by network communication path 381), access network node 343 is referred to as being multi-homed to provider edge nodes 360 and 365 (and so for BUM traffic, for example, are in the same ES).

Also shown in FIG. 3 are network communications 395, which are simply representative of the forwarding of one or more frames from provider edge node 360 (as DF) to provider edge node 365 (as non-DF), in an embodiment of methods and systems such as those described herein. That being the case, network communications (e.g., as might be communicated between network devices, such as network communications 390 from customer edge node 335 to customer edge node 330) can, in certain circumstances, encounter a link (or port, network route, or other communications pathway) that is not operational. For example, such a communications pathway might be in a non-operational state as a result of being in a blocking state, having experienced a failure or topology change, or the like, such as that represented by a network failure 399 in network communication path 380. In such situations, an alternate pathway can be used to convey the frame/its packet, as by way of network communications 395 and 391, in embodiments such as those described herein. In such embodiments, network communications are conveyed as network communications 395, from provider edge node 360 to provider edge node 365. Such network communications are then conveyed from provider edge node 365 to access network node 343 via network communications paths 381, as network communications 391. Network communications 395 can be configured as part of the process of configuring provider edge nodes in a redundancy group, such as provider edge nodes 360 and 365. In such a scenario, a provider edge node advertises information (e.g., a label such as a redirect label) to other provider edge nodes in the redundancy group), which can then be used by the other provider edge nodes in the redundancy group to forward network traffic to the advertising provider edge node, in the case of a network failure (e.g., a failure in a link with the access network, via which a frame's packet is to be forwarded). As will be appreciated in light of the present disclosure, each such provider edge node will typically send such advertisements.

In the example presented in FIG. 3, provider edge node 365 advertises one or more redirect labels to provider edge node 360 (e.g., a UR label and/or a BR label that uniquely identify provider edge node 365, at least within the given redundancy group, and allow provider edge node 360 to forward redirected frames to provider edge node 365 as a unicast network traffic). Such redirect labels can be advertised, for example, on a per EVI basis (UR label for unicast network traffic, per EVI/EAD) or a per ESI basis (BR label for BUM network traffic, per ESI/EAD)

By including such a redirect label in a frame forwarded to provider edge node 365, provider edge node 360 can indicate to provider edge node 365 that a packet contained in that frame should be forwarded to the intended customer edge device (customer edge node 330) via the access network (access network 310), without regard to the blocking of such a packet that might otherwise be performed. More particularly, with regard to networked topology 300, the inclusion of such a redirect label indicates to provider edge node 365 that such network traffic should be forwarded to access network node 343 via network communication path 381 as network communications 391, notwithstanding the fact that provider edge node 365 is a non-DF in the given redundancy group (e.g., for the given Ethernet Segment), which would otherwise result in such network traffic being blocked. That being the case, such forwarding can be put into effect, for example, in the case in which network communication path 380 experiences a failure (e.g., network failure 399), and network communication path 381 remains functional. In such a case, upon receipt of a frame that would otherwise be sent to access network node 343 by provider edge node 360 via (now-failed) network communication path 380, provider edge node 360 includes the advertised information (e.g., redirect label) in frames conveyed by network communications 395, which can then be sent by way of network communication path 381 as network communications 391.

In certain embodiments, remote provider edge core 370 operates in a single-active fashion, with regard to the provider edge nodes in a given redundancy group. For example, in FIG. 3, if a failure such as network failure 399 occurs, network traffic coming from access network node 350 that is destined for access network node 343 can still transit provider edge node 360 to provider edge node 365, until such time as the DF election process elects a new DF (e.g., in the present case, provider edge node 365, for example). As noted, such an election process can involve relatively long periods of time, and so the ability to quickly divert traffic from the existing DF to a non-DF, until such time as a new DF can be elected, is advantageous.

Features provided by methods and systems such as those described herein are based on certain features. Network architectures such as those described herein may employ certain assumptions. These include:
Peering core edge nodes share the same Ethernet Segment Identifier (ESI).
In a network employing the border gateway protocol (BGP), the peering PEs support the multi-homing mode referred to earlier herein as single-active.

Thus, in a situation in which a failure such as that described occurs, a designated forwarder (DF) election backend procedure such as per-Ethernet Segment (ES)/Ethernet Auto-Discovery (EAD) or per-EVPN Instance (EVI)/EAD route advertisement/withdraw is performed.

As will be appreciated in light of the present disclosure, implementations of embodiments such as those described herein provide for the rerouting of both unicast and BUM traffic. Further, as noted, forwarding of frames affected by failures can begin upon detection of those failures, and so can avoid delays such as those involved in a DF election process. EVPN supports unicast labeling (advertised via per-EVI/EAD route) and multicast labeling (advertised via Inclusive Multicast Ethernet Tag (IMET) route). Additionally, redirect labels, as such constructs are referred to herein, can be allocated, for example, as follows:

1 redirect label is advertised per EVI/ESI for multicast traffic (via per-ESI/EAD route) (such a redirect label, given its application to BUM network traffic, being referred to herein as a BUM redirect (BR) label)
2 redirect label is advertised per EVI for unicast traffic (via per-EVI/EAD) (such a redirect label being referred to herein as a unicast redirect (UR) label)

In such an implementation, as noted elsewhere herein, network traffic received by an edge node and encountering a failure on a specific ES is redirected to an appropriate peering PE. In so doing, for example, a VPN label in the redirected frame is replaced with a redirect label of some type (e.g., the redirect label types discussed herein being, as examples, a UR label and a BR label), indicating to the PE receiving the network traffic that the network traffic is to be handled differently from normal traffic. Further, it will be appreciated in light of the present disclosure that, while the list of redirect label examples presented above are possible embodiments of certain of the concepts presented herein, such examples are in no way intended to be exhaustive, and thus, such a redirect label can also be configured on a per-EVI basis, a per-ESI basis, a per-MAC basis, or the like, as well as other non-limiting embodiments that will be apparent in light of the present disclosure, and which are intended to be comprehended thereby.

A similar approach can be employed between CE devices and core edge nodes when MPLS is used (e.g., when a pseudo-wire is implemented through the given access network (referred to herein as an access pseudo-wire)).

In light of the foregoing, it will be appreciated that, when a core edge node forwards network traffic to an Ethernet Segment (ES) and the PE-to-CE link in question is in a failure state, unicast network traffic is redirected to the peer PE using a UR label. Such a frame's label stack includes a UR label followed by an optional flow label, as described in greater detail subsequently. Alternatively, BUM network traffic encountering a PE-to-CE link in failure state in this manner is subject to ES identifier (ESI) filtering. If this BUM network traffic is not filtered out as a result of its ESI label, the BUM frames can be optionally redirected to the peer PE using a BR label. Such a frame's label stack includes a BR label followed by an optional flow label, as described in greater detail subsequently. In either case, such redirected network traffic (frames) should conform to EVPN unicast network traffic formats and content (e.g., with respect to the MPLS label stack).

As to the peer PE receiving such redirected network traffic, the handling of such frames depends on the type of label (UR label or BR label) in each frame. In the case of a redirected frame that includes a UR label, the peer PE redirects such frames to the appropriate (local) PE-to-CE link, regardless that link's DF/non-DF state. As will be appreciated in light of the present disclosure, if this local PE-to-CE link is not operational (e.g., in a failure or blocking state, due to failure, topology change, or the like), the peer PE drops the redirected network traffic. As will be appreciated in light of the present disclosure, in order to prevent such UR-labeled frames from experiencing a loop (and so "ping-ponging" between edge nodes), a peer PE receiving such redirected network traffic does not perform redirection of already-redirected network traffic.

Alternatively, in the case of the redirected frame received by the peer PE including a BR label, the peer PE determines the state of the local PE-to-CE link (DF/non-DF), and redirects such frames to the appropriate (local) PE-to-CE link if the link in question is in the non-DF state. If the link in question is in the DF state, the peer PE blocks the packet in question by dropping the frame. With regard to preventing duplicate packets being sent to a given customer device, core edge nodes already forwarding BUM network traffic to that customer device should not forward redirected BUM network traffic to that customer device.

As will be appreciated in light of the present disclosure, embodiments such as those described herein provide a number of advantages. For example, such implementations allow for the fast and efficient rerouting of unicast and BUM network traffic when using a single-active multi-homing load-balancing mode. Such an approach also allows for the fast and efficient rerouting of BUM traffic when using an all-active multi-homing load-balancing mode. Such advantages are enhanced when MPLS is used between CE devices and PE devices, allowing its usage over a virtual pseudo-wire service (VPWS) pseudo-wire. Such redirected network traffic can also be transmitted to CE devices, which allows, on switchover, CE-to-PE network traffic to be forwarded through a non-DF link. Further still, such implementations can also be leveraged in an EVPN-VPWS single-active load-balancing mode. The same concepts apply in scenarios in which the redirect label is signaled between peering PEs.

Example of an Access Network Failure Handling Scenario

Figure 4A:
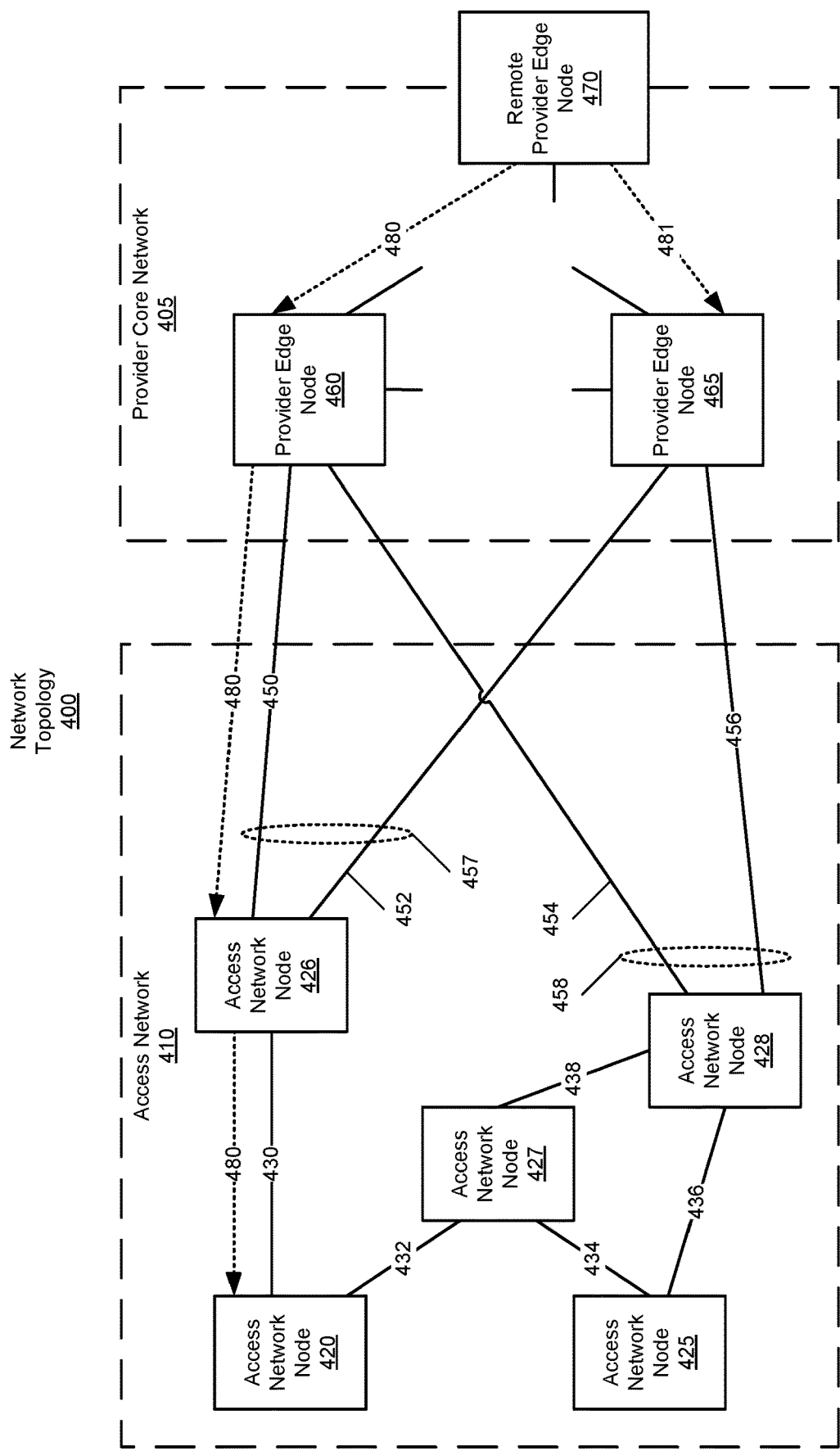
FIG. 4A is a block diagram illustrating an example of various operational scenarios in a simplified network topology, according to one embodiment.

FIG. 4A is a block diagram illustrating an example of a simplified network topology, according to one embodiment. FIG. 4A illustrates a network topology 400 comparable to others of the examples described herein, although simplified for ease of description. Network topology 400 includes a provider core network 405 and an access network 410. In turn, access network 410 includes access network nodes 420 and 425, as well as access network nodes 426, 427, and 428. Linking various ones of access network nodes 420, 425, 426, 427, and 428 are network connections 430, 432, 434, 436, and 438.

Linking access network nodes 426 and 428 to provider core network 405 are network connections 450, 452, 454, and 456 (such network connections also being referred to herein as being or including one or more links). More particularly, access network node 426 is multi-homed to provider edge nodes 460 and 465 by network connections 450 and 452, respectively, which is represented in the aggregate by way of a bundled interface on access network node 426 (depicted in FIG. 4A by a bundled interface 457). Similarly, access network node 428 is multi-homed to provider edge nodes 460 and 465 by network connections 454 and 456, respectively, which is represented in the aggregate by way of a bundled interface on access network node 428 (depicted in FIG. 4A by a bundled interface 458). In multi-homing access network nodes such as access network nodes 426 and 428, the network connections providing such multi-homing (e.g., network connections 450 and 452, and network connections 454 and 456) can thus be effected by bundling the network connections of the given access network node, essentially allowing a provider edge node such as provider edge nodes 460 or 465 to receive a packet on any of the ports of such bundled interfaces. Provider core network 405, in supporting the aforementioned network communications, includes provider edge nodes 460 and 465, as well as a remote provider edge node 470. As noted, network topology 400 depicts only those network devices salient to the following discussions.

Also depicted in FIG. 4A is network traffic, which is identified in the generic as being conveyed through access network 410 and provider core network 405 over a network communications path 480, in the manner of network communications 390 of FIG. 3, in the case of such network communications being unicast network traffic. In the case of BUM network traffic, remote provider edge node 470 may flood a given frame to both provider edge node 460 (as represented by network communications path 480) and provider edge node 465 (as represented by a network communications path 481).

Thus, in the case of unicast network traffic, the network traffic represented by network communications path 480 could, for example, be between remote and local customer edge nodes such as customer edge nodes 330 and 335 of FIG. 3. More particularly, with respect to the present disclosure, unicast network traffic traversing network communications path 480, in pertinent part, is sent from a remote provider edge node such as remote provider edge node 470, to a provider edge node such as provider edge node 460 (and possibly through core nodes (not shown) of provider core network 405). Such network traffic is forwarded toward its destination (the destination of the packet) by then traversing access network nodes 426 and 420 over network connections 450 and 430, following network communications path 480, for example. In the case of BUM network traffic, where provider edge node 460 has been elected the designated forwarder (DF) node for the redundancy group, network traffic received via network communications path 481 (as a result of being flooded by remote provider edge node 470)

is blocked by (non-DF) provider edge node 465 (e.g., as by dropping the flooded copy of the frame in question).

Figure 4B:
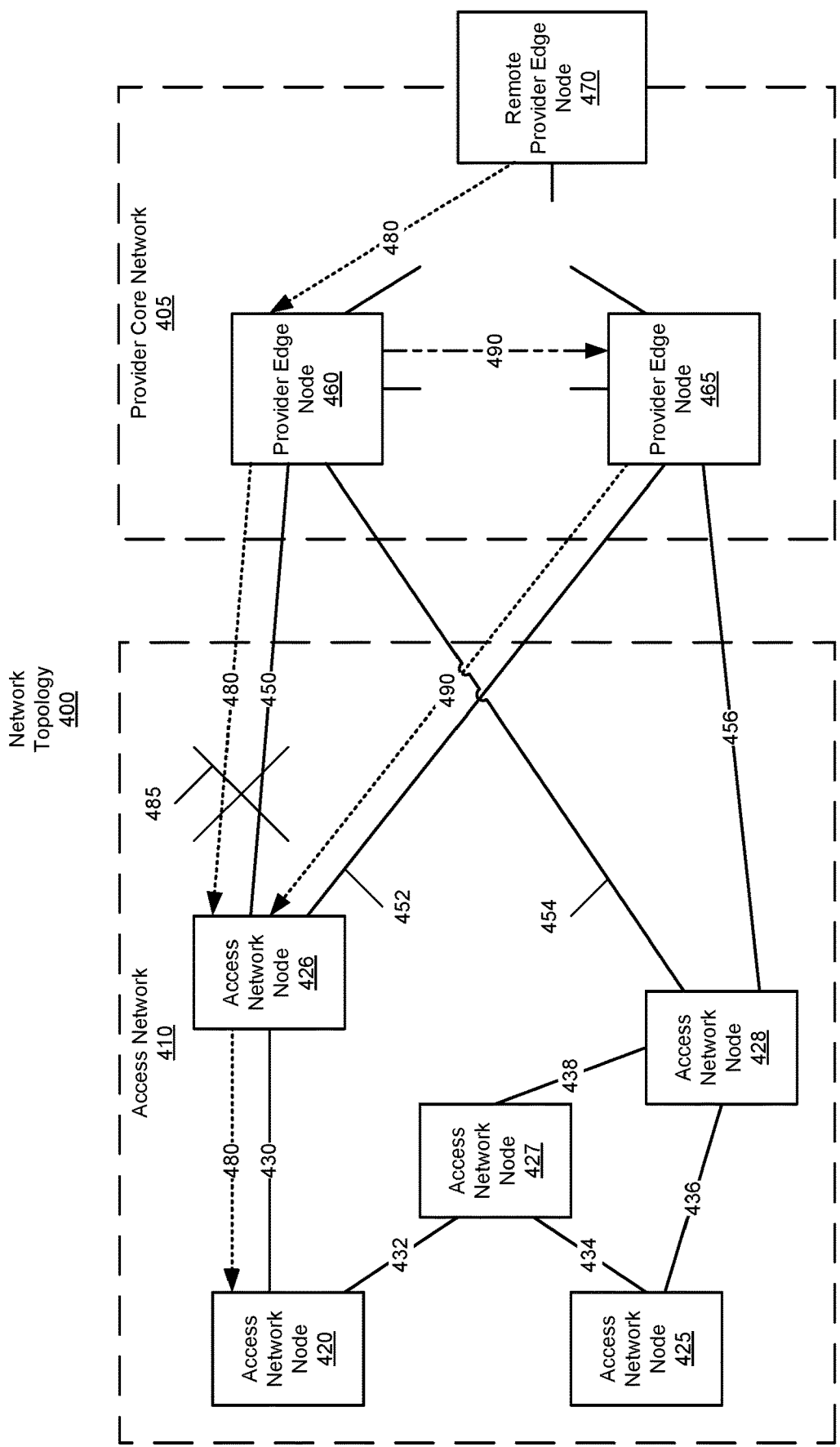
FIG. 4B is a block diagram illustrating an example of a failure scenario in a simplified network topology such as that depicted in FIG. 4A, according to one embodiment.

FIG. 4B is a block diagram illustrating an example of a failure scenario in a simplified network topology such as that depicted in FIG. 4A, according to one embodiment. FIG. 4B again illustrates network topology 400, in the manner of FIG. 4A. FIG. 4B depicts a failure scenario in which the topology of access network 410 begins in the same original configuration as that depicted in FIG. 4A, with access network node 426 multi-homed to provider edge nodes 460 and 465 by network connections 450 and 452, respectively, and access network node 428 is multi-homed to provider edge nodes 460 and 465 by network connections 454 and 456, also respectively. As will be appreciated in light of the present disclosure, FIG. 4B depicts a scenario in which unicast network traffic is originally carried by network communications path 480. As will be further appreciated, remote provider edge node 470 sends unicast network traffic to provider edge node 460 as its destination, and so does not flood such network traffic to the peer PE nodes of provider edge node 460 that are in the redundancy group (e.g., provider edge node 465), and so such network traffic does not involve network traffic such as that carried by network communications path 481 of FIG. 4A.

As noted, a number of scenarios exist (resulting from, e.g., changes in topology configuration due to, for example, failure scenarios, imposition of dynamic and/or static operating constraints, and other such events) that can be addressed by methods and systems such as those described herein, in a network topology such as network topology 400. For example, a link failure in access network 410 (e.g., depicted in FIG. 4B as a link failure 485) can result in the need to perform a re-determination of the network connections involved (e.g., as by the triggering of a DF election process). As will be appreciated in light of the present disclosure, while the example of a link failure is depicted in FIG. 4B, it will be appreciated that failures contemplated by the present disclosure not only include such link failures, but also failures such as the failure of one or more network interfaces of the given DF, nodal failures of one or more access network nodes, and the like.

In a scenario such as that depicted in FIG. 4B, provider edge nodes 460 and 465 are members of the redundancy group resulting from the multi-homing of access network node 426. As part of the methods and systems described herein, provider edge node 465 will have provided information (e.g., a unicast redirect (UR) label) to provider edge node 460 as part of the creation of the redundancy group (e.g., as part of control plane communications between the two provider edge nodes, by way of, for example, BGP messages). This information is used by provider edge node 460, in the event of a failure such as link failure 485, to indicate to provider edge node 465 that frames including this information (the UR label for provider edge node 460) are being sent to provider edge node 465 as the result of a failure, and so indicating that such frames should be forwarded to the appropriate multi-homed access network node, notwithstanding the fact that provider edge node 465 would otherwise block such frames from being forwarded (e.g., as by dropping such frames). Provider edge node 465, having received one or more frames including this information, bypasses the blocking that would otherwise be performed, and forwards such frames over network connection 452, as network communications path 490. Having arrived at access network node 426, such network traffic (packets) can then be forwarded to access network node 420 over network connection 430, as network communications 480.

As noted earlier, the advertisement of the failure by provider edge node 460 is received by remote provider edge node 470. In turn, remote provider edge node 470 can perform operations related to the election of a new DF (e.g., provider edge node 465). However, while such processes are progressing, remote provider edge node 470 can continue to send network traffic to provider edge node 460, which, by way of network communications paths 480 and 490, will continue to be received by access network node 426. Once a new DF is elected (e.g., provider edge node 465) and provider core network 405 converges, remote provider edge node 470 can transition to sending frames of the affected network communications to provider edge node 465, rather than provider edge node 460.

Figure 4C:
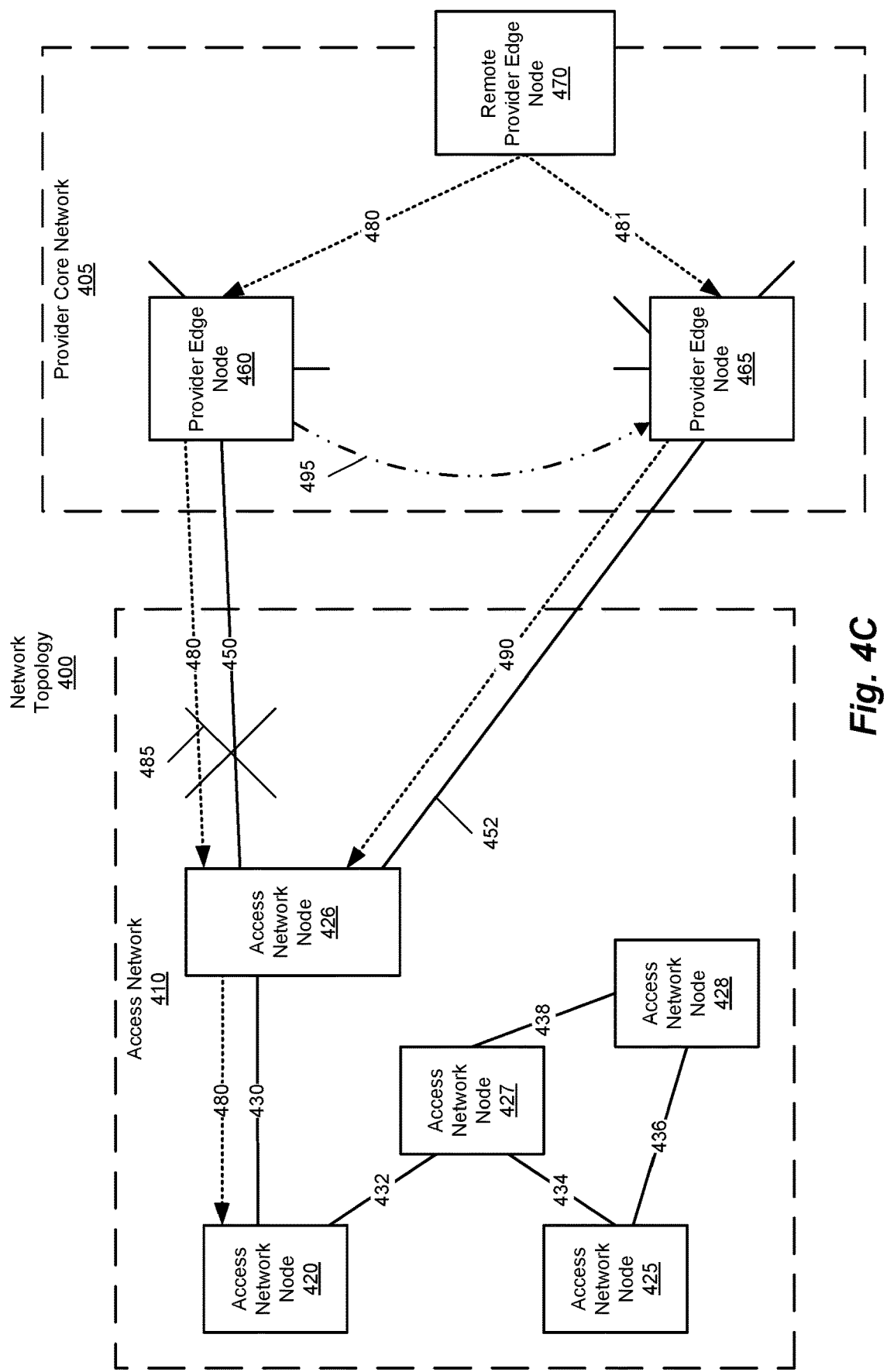
FIG. 4C is a block diagram illustrating an example of a failure scenario in a simplified network topology such as that depicted in FIG. 4A, according to one embodiment.

FIG. 4C is a block diagram illustrating an example of a failure scenario in a simplified network topology such as that depicted in FIG. 4A, according to one embodiment. FIG. 4C again illustrates network topology 400, in the manner of FIG. 4A. FIG. 4C depicts a failure scenario in which the topology of access network 410 begins in the same original topology of FIG. 4A, with access network node 426 multi-homed to provider edge nodes 460 and 465 by network connections 450 and 452, respectively, and access network node 428 is multi-homed to provider edge nodes 460 and 465 by network connections 454 and 456, also respectively. However, in contrast to the scenario depicted in FIG. 4B, the scenario depicted in FIG. 4C is one in which BUM network traffic is flooded (by remote provider edge node 470) to provider edge nodes 460 and 465 via network paths 480 and 481, in the manner noted in connection with FIG. 4A.

As will be appreciated in light of the present disclosure, FIG. 4C depicts a scenario in which BUM network traffic is originally carried by network communications path 480. In such a scenario, a link failure in access network 410 (e.g., depicted in FIG. 4C as link failure 485, as before) can result in the need to perform a re-determination of the network connections involved (e.g., as by the triggering of a DF election process). As will be appreciated in light of the present disclosure, such failures can include not only link failures, but also failures such as the failure of one or more network interfaces of the given DF, nodal failures of one or more access network nodes, and the like.

In a scenario such as that depicted in FIG. 4C, provider edge nodes 460 and 465 are members of the redundancy group resulting from the multi-homing of access network node 426 to these provider edge nodes. As part of the methods and systems described herein, provider edge node 465 will have provided information (e.g., a BUM redirect (BR) label) to provider edge node 460 as part of the creation of the redundancy group (e.g., as part of control plane communications between these provider edge nodes, by way of, for example, BGP messages). This information is used by provider edge node 460, in the event of a failure such as link failure 485, to indicate to provider edge node 465 that frames including this information (the BR label for provider edge node 465) are being sent to provider edge node 465 as the result of a failure, and so indicating that such frames should be forwarded to the appropriate multi-homed access network node, notwithstanding the fact that provider edge node 465 would otherwise block such frames from being forwarded (e.g., as by dropping such frames).

In contrast to the unicast network traffic scenario depicted in FIG. 4B, that depicted in FIG. 4C illustrates the handling of such BUM network traffic. Prior to the convergence of provider core network 405 in response to link failure 485, a frame flooded to provider edge nodes 460 and 465 by remote provider edge node 470 are handled based on whether the given provider edge node (and, more specifically, the state of the link in question (e.g., network connections 450 and 452)) is currently in the DF or non-DF state. That being the case, a frame forwarded via network communications path 481 is blocked by provider edge node 465. Such a frame, received by provider edge node 460 via network communications path 480, is forwarded by provider edge node 460 to provider edge node 465. In the present example, provider edge node 460 will have received a BR label from provider edge node 465.

In the example presented in connection with FIG. 4C, provider edge nodes 460 and 465 can be viewed as being directly connected by an Ethernet connection that supports a network communications path 495. In such a scenario, provider edge node 460 can identify provider edge node 465 as the peer PE node to which the frame in question will be forwarded, and replace the frame's VPN identifier with the BR label provided by provider edge node 465. Provider edge node 460 can then forward the modified frame to provider edge node 465 as a unicast frame. In such a scenario, provider edge node 460 need not include any MPLS labels as a label stack in the frame sent to provider edge node 465. Provider edge node 465, having received a frame including this information, bypasses the blocking that would otherwise be performed (as it would the copy of the frame received via network communications path 481), and forwards such frames over network connection 452, as network communications path 490. Having arrived at access network node 426, such network traffic (packets) can then be forwarded to access network node 420 over network connection 430, as network communications 480.

In an alternative to a direct connection between provider edge node 460 and provider edge node 465 just described, other nodes in provider core network (one or more core nodes and/or core edge nodes) may be communicatively coupled between provider edge node 460 and provider edge node 465. In such a case, provider edge node 460 can prepend one or more MPLS labels in the appropriate position(s) in the frame sent to provider edge node 465. In so doing, provider edge node 460 forwards the frame to provider edge node 465 as a unicast message, via such intervening provider network nodes. The contents of such frames are discussed in greater detail in connection with FIG. 5, subsequently.

It will be appreciated that, during the DF election process, provider edge node 465 continues blocking frames flooded thereto by remote provider edge node 470 via network indications path 481. Once a designated forwarder is elected as the new DF (provider edge node 465, in this example), the new DF will begin forwarding the BUM network traffic it receives from remote provider edge node 470, rather than blocking such frames. At that point, being DF, the new DF will also begin blocking frames received with its BR label, in order to avoid the possibility of forwarding duplicate packets. As provider core network 405 converges, provider edge node 460 will become non-DF, and so will begin dropping BUM network traffic, and also cease modifying and forwarding such frames.

As noted earlier, the advertisement of the failure by provider edge node 460 is received by remote provider edge node 470. In turn, remote provider edge node 470 can perform operations related to the election of a new DF (e.g., a currently non-DF node such as provider edge node 465). However, while such processes are progressing, remote provider edge node 470 can continue to flood BUM network traffic in the manner noted. Provider edge node 460 will, in turn, also continue forwarding frames in the manner noted, which (by way of network communications path 480 and network communications paths 495/490) will continue to be received by access network node 426. These operations can continue while a new DF is being elected and provider core network 405 is converging.

Figure 5:
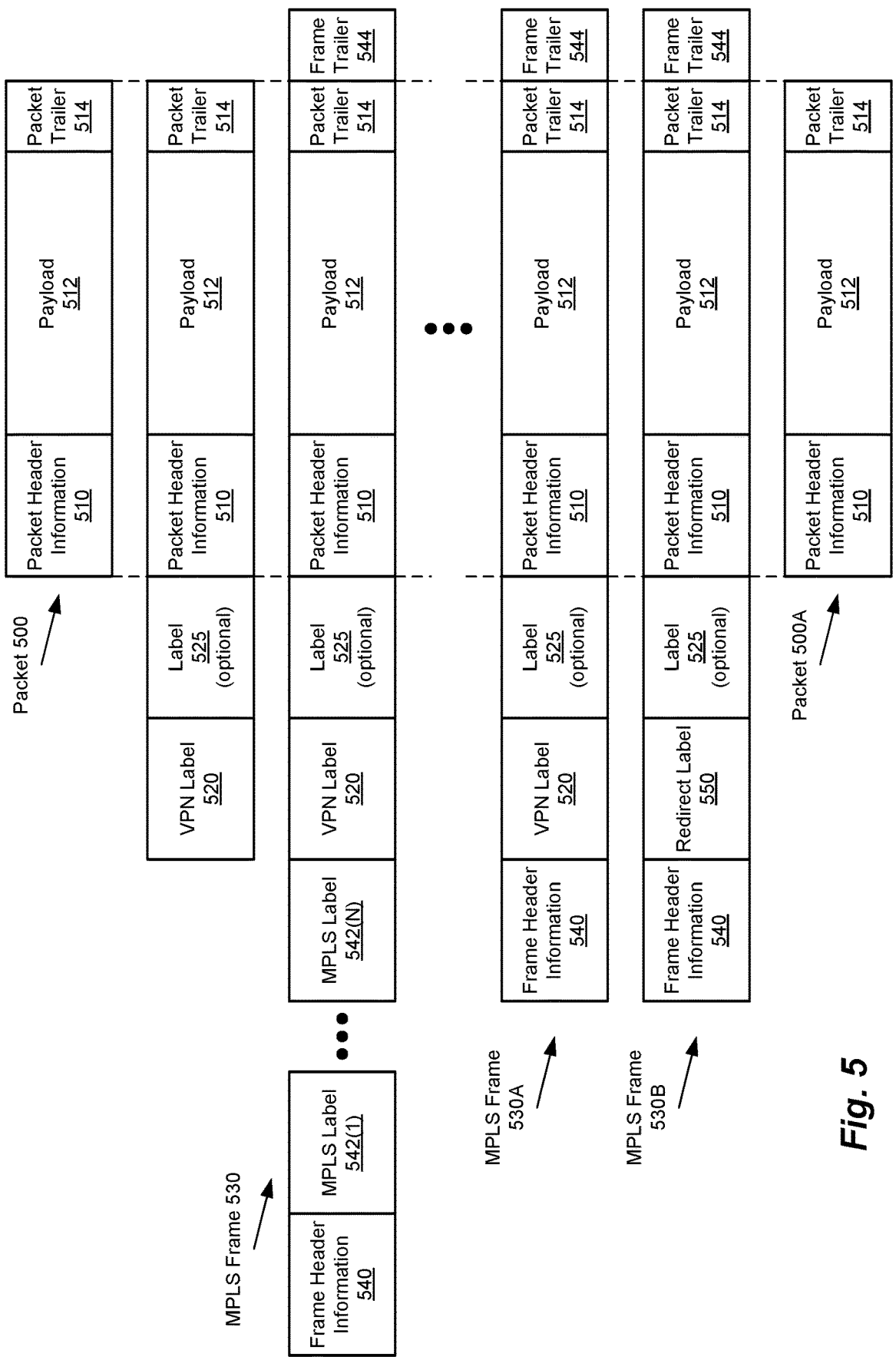
FIG. 5 is a block diagram illustrating an example of the contents of a packet/frame at different points in a core network, according to one embodiment.

FIG. 5 is a block diagram illustrating an example of the contents of a packet/frame at different points in a core network, such as that depicted in FIGS. 4A, 4B, and 4C, according to one embodiment. To this end, FIG. 5 depicts a packet 500, which includes packet header information 510, a payload 512, and a packet trailer 514. Using networked topology 400 as an example, a packet such as packet 500 might be received by remote provider edge node 470 from a customer edge device (possibly via an access network, such as access network 315 of FIG. 3). In constructing a frame to be conveyed through a provider core network such as provider core network 405, a VPN label 520 and a label 525 are prepended to packet 500. In the case of unicast network traffic, label 525 can be an optional flow label. Such a flow label can be used, for example, in equal-cost, multiple path (ECMP) situations, and so facilitate load-balancing between such ECMP paths. Alternatively, label 525 can be an optional ESI label, in order to facilitate identification of the ES in which given network traffic is being sent (thereby allowing a node receiving such a frame to determine the ES in which the given frame has been sent). Generally, it will also be appreciated that, in certain embodiments, packet header information 510, in combination with VPN label 520 and label 525, are sufficient to allow a determination on which link is to be used to forward a packet such as packet 500 to a node of access network 410, such as node 426 (e.g., as by node 460 or 465).

Also presented in the example depicted in FIG. 5 is labeling defined by a Multi-Protocol Label Switching (MPLS) protocol, which can be implemented in, for example, provider core network 405. In such an implementation, additional information is prepended and appended to packet 500, in order to generate an MPLS frame 530. Such additional information can include, for example frame header information 540, (potentially) one or more MPLS labels (depicted in FIG. 5 as MPLS labels 542(1)-(N)), and a frame trailer 544.

Frame header information 540 can include network address information, protocol information, and the like. For example, frame header information 540 can be network address information for the reliable transmission of data frames between two nodes connected by a physical layer, such as a data link layer (e.g., Layer 2 of the Open Systems Interconnection (OSI) model, such as, but not limited to, Ethernet information).

Once received by remote provider edge node 470 (from an access network node, or directly from a customer edge device), MPLS frame 530 is constructed around packet 500 in the manner described, and forwarded by remote provider edge node 470 through provider core network 405 (potentially via one or more core network nodes), to provider edge node 460 along communications path 480. Upon receipt and processing by provider edge node 460, MPLS frame 530 appears as MPLS frame 530A. In the scenario depicted in FIG. 4A, provider edge node 460 removes frame header information 540, VPN label 530, and frame trailer 544, and forwards the remaining packet 500A along network communications path 480, to access network node 426 in access network 410 (which then transports packet 500 to its intended CE device).

However, should a failure occur (e.g., link failure 485), provider edge node 460 will be unable to forward packet 500A by processing MPLS frame 530A in the normal course. In response to such a failure, provider edge node 460 (more specifically, the link in question) goes into a non-DF state (within the given redundancy group). However, the link of provider edge node 465 that would be expected to go into the DF state as a result of the election process, may remain in the non-DF state for some (relatively long) period of time, until provider edge node 465 receives notification from provider edge node 460 (e.g., by way of BGP) of the affected link's having gone into the non-DF state. As a result of such a situation, provider edge node 460 will be unable to forward the frame in question via the now-failed link, while provider edge node 465 would otherwise block such a frame.

To address such a situation, provider edge node 460 forwards a frame (e.g., MPLS frame 530A) to a peer PE (e.g., provider edge node 465) by replacing the frame's VPN label with a redirect label (e.g., a UR label, in the case of a unicast frame, or a BR label, in the case of a BUM frame), thereby generating a modified frame (e.g., MPLS frame 530B). If the frame received by provider edge node 460 is a unicast frame (as indicated by its VPN label), provider edge node 460 replaces the VPN label with a UR label and forwards this modified frame to provider edge node 465. As noted elsewhere herein, such a frame's label stack can also include an optional flow label. Upon receipt of the modified frame, provider edge node 465 processes and forwards the packet contained therein (e.g., packet 500A) to its intended destination (e.g., access network node 426), bypassing the blocking that would normally prevent such forwarding (and, as noted, regardless of whether the link is in the DF or non-DF state). Alternatively, if the frame received by provider edge node 460 is a BUM frame (as indicated by its VPN label), can perform ESI filtering (thereby, such ESI information allowing the receiving edge node to determine the ES for which the frame is intended, and so avoid the creation of loops by filtering out looping frames). If, as a result of ESI filtering, a determination is made that the BUM frame can be redirected to provider edge node 465, provider edge node 460 replaces the VPN label with a BR label and forwards this modified frame to provider edge node 465. As noted elsewhere herein, such a frame's label stack can also include an optional flow label. Assuming that the given link of provider edge node 465 is still in the non-DF state, provider edge node 465 forwards the packet contained therein (e.g., packet 500A) to its intended destination (e.g., access network node 426), bypassing the blocking that would normally prevent such forwarding. However, once provider edge node 465 finishes its transition of this link to the DF state, having been thus elected, receipt of such a modified frame results in its being blocked (e.g., dropped), in order to prevent the forwarding of duplicate packets.

As noted, MPLS labels 542(1)-(N) are optional when used in combination with a redirect label such as that described herein. While not a requirement, provider edge nodes 460 and 465 will often be communicatively coupled to one another by an Ethernet connection, and thus, such MPLS labeling will be unnecessary. In such a case, frame header information 540 in MPLS frame 530A can include Ethernet (Layer 2) header information. As will be appreciated in light of the present disclosure, then, provider edge node 460 will typically select a port that is communicatively coupled to provider edge node 465, over a port communicatively coupled to another provider network node (and would therefore involve one or more MPLS labels).

However, in situations in which such communicative coupling is not the case, provider edge node 460 can forward an MPLS frame such as MPLS frame 530B by including MPLS labels (e.g., MPLS labels such as one or more of MPLS labels 542(1)-(N), in the fashion depicted in FIG. 5) in the MPLS frame in question. Thus, if such a direct connection is not provided, communication by way of intervening provider edge nodes and/or provider core nodes can be employed. In order to convey MPLS frame 530B between peer PEs (e.g., provider edge nodes 460 and 465), MPLS labels identifying provider network nodes along a path to the intended provider edge node would be included in the MPLS frame in question, in a position comparable to that depicted in MPLS frame 530. Such MPLS labels would thus describe a unicast path from provider edge node 460 to provider edge node 465, in the examples presented in FIGS. 4A, 4B, and 4C.

Example Processes

Figure 6:
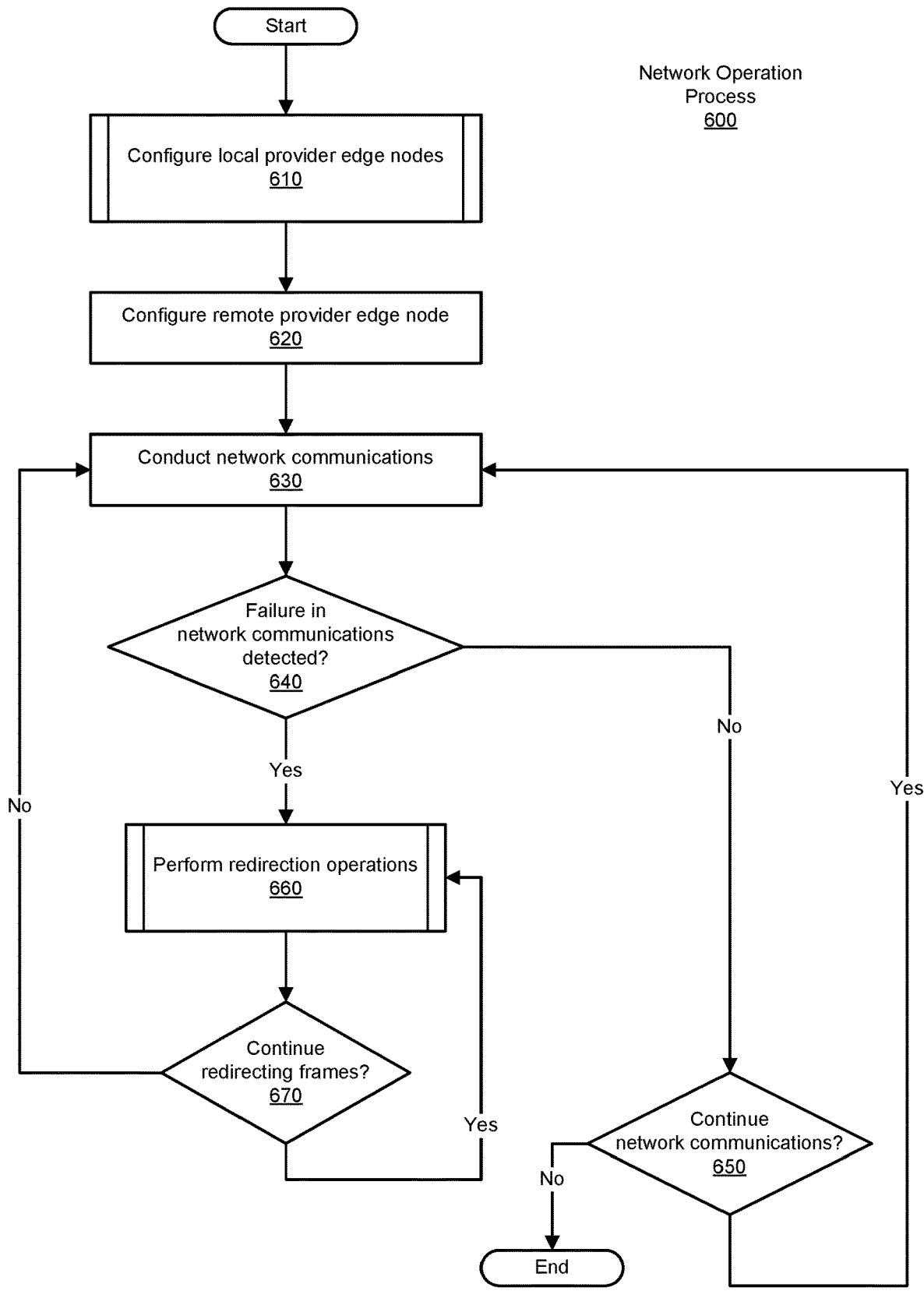
FIG. 6 is a simplified flow diagram illustrating an example of a process for network configuration, according to one embodiment.

FIG. 6 is a simplified flow diagram illustrating an example of a process for network operation, according to one embodiment. FIG. 6 thus depicts example operations performed in a network operation process 600. Network operation process 600 begins with the configuration of the local provider edge nodes within the given redundancy group (610). As will be appreciated, nodes in the access network, including the provider edge nodes in the redundancy group, will, in certain embodiments, be included as members of the given network segment (e.g., an Ethernet Segment of a virtual private network). Configuration of the local provider edge nodes in a redundancy group, with particular regard to embodiments described herein, is described in greater detail in connection with the process depicted in FIG. 7, subsequently. Next (or, alternatively, in parallel with such operations), one or more remote provider edge nodes are configured (620). As will be appreciated in light of the present disclosure, the processes now described are generally directed to configuring the network devices involved, subportions of one or more networks such as the core nodes of a core network, and the network as a whole, are performed in the context of (and substantially contemporaneously with) the configuration of local and remote core edge nodes of such a core network, as well as any configuration operations performed by core nodes internal to the core network.

The nodes of the provider network having been configured (and, as will be appreciated in light of the present disclosure, CE devices and access network nodes having also been configured (not shown)), network communications can proceed (630). With respect to core edge nodes such as provider edge nodes 460 and 465, such communications processes are typically performed in conjunction with other operations performed with respect to the local core edge node in facilitating network communications in the access network, in the core network, and therebetween. Such network communications can proceed until such time, for example, as a failure is detected (640). If no such failure is detected, network indications can (650) continue in the normal course (illustrated in network operation process 600 by its iteration to conducting such network communications (630)), until such time as such network communications conclude.

In the case in which a failure is detected (640), steps can be taken to ameliorate certain of the effects thereof, in view of embodiments such as those described herein. Such detection can be effected, for example, by a provider edge node elected as DF for the given redundancy group (e.g., provider edge node 460). In such a scenario, a redundancy group's DF will perform redirection operations (660), until such time as the situation is resolved (e.g., a new DF is elected and the core network converges, the failure is resolved, and/or other such event occurs) (670). As noted, normal network operations can then continue (630). Such redirection processes, with particular regard to embodiments described herein, is described in greater detail in connection with the processes depicted in subsequent figures.

Figure 7A:
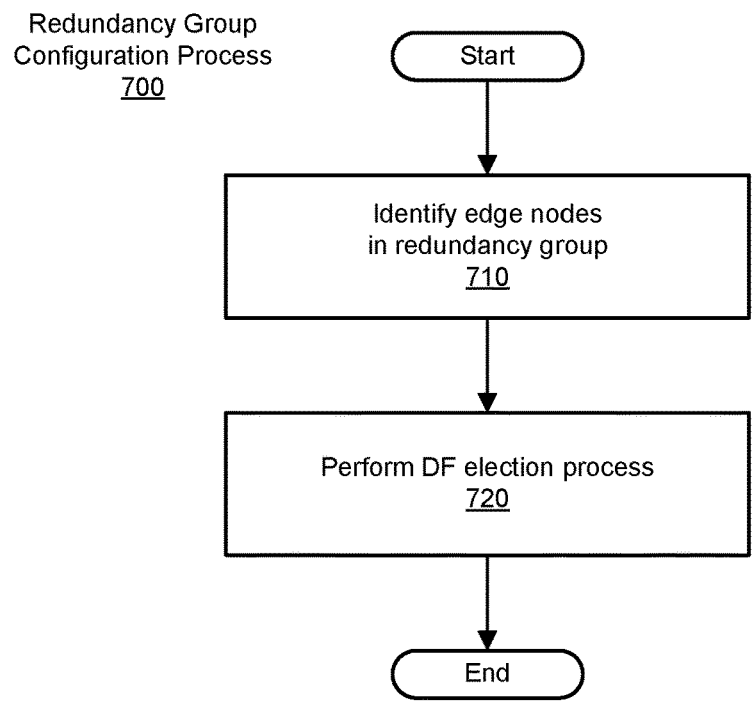
FIG. 7A is a simplified flow diagram illustrating an example of a redundancy group configuration process, according to one embodiment.

FIG. 7A is a simplified flow diagram illustrating an example of a redundancy group configuration process, according to one embodiment. FIG. 7A depicts a local edge node configuration process 700. As will be appreciated in light of the present disclosure, the operations depicted as making up redundancy group configuration process 700 are among other operations performed by provider edge nodes in participating in the configuration and operation of redundancy group in a core network such as a provider network, and more particularly, in supporting functionalities involved in a network implementing Ethernet virtual private network (EVPN) in a provider core network, which, in turn, may employ protocols such as multiprotocol label switching (MPLS) techniques, as described earlier.

Redundancy group configuration process 700 begins with the identification of edge nodes (and their links) in the given redundancy group (710). As noted elsewhere herein, such a redundancy group can be defined by, for example, on a per-EVI basis, in the case of unicast network traffic, or on a per Ethernet Segment (as, in turn, identified by an Ethernet Segment identifier (ESI)) basis, in the case of BUM network traffic. At this juncture, one of the core edge nodes in the redundancy group is elected as the designated forwarder. In an EVPN implementation, this is accomplished by performing a DF election process (720). Redundancy group configuration process 700 then concludes.

Figure 7B:
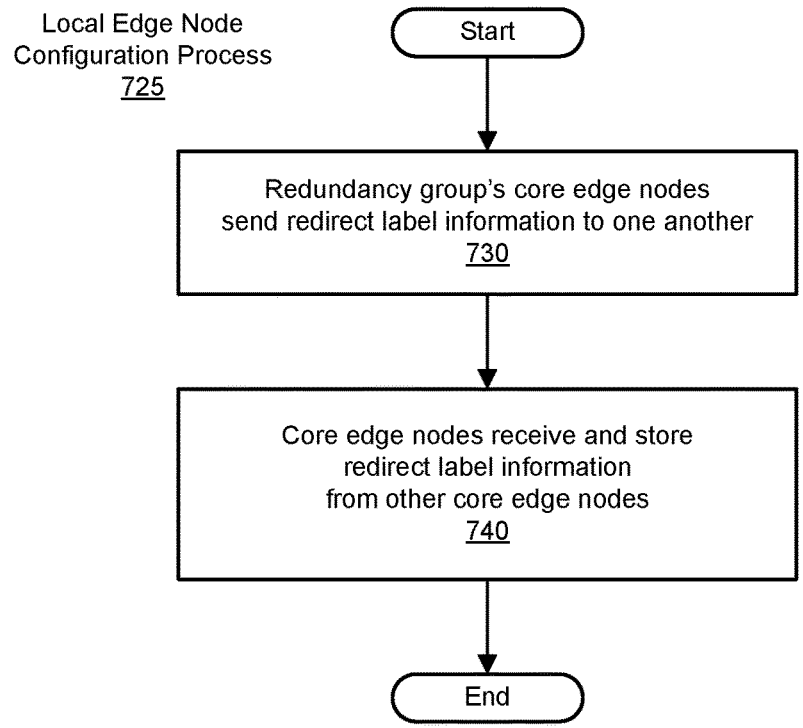
FIG. 7B is a simplified flow diagram illustrating an example of a local edge node configuration process, according to one embodiment.

FIG. 7B is a simplified flow diagram illustrating an example of a local edge node configuration process, according to one embodiment. FIG. 7 depicts a local edge node configuration process 725, which will typically (though not necessarily) be performed independently of redundancy group configuration process 700. As will be appreciated in light of the present disclosure, such operations are among other operations, such as those noted in connection with redundancy group configuration process 700. Further, as part of control plane communications between the core network nodes (and particularly, between the core edge nodes), which may be accomplished using gateway protocols such as the interior gateway protocol (IGP) (and particularly, with regard to the core edge nodes, the border gateway protocol (BGP)), messages are conveyed between the redundancy group's edge nodes. Such communications include the redundancy group's edge nodes sending messages to one another, and, according to embodiments such as those described herein, facilitate such edge nodes advertising redirection information to one another (e.g., redirect label information, for example, in the form of advertisements including UR label information and BR label information for the given core edge node sending the messages in question). The core edge nodes can use this redirection information to forward frames to the core edge node in question, and so indicate that frames thus labeled are to be forwarded on to their destination, notwithstanding the blocking that might otherwise be performed (and so bypassing such blocking) (730). More specifically, for unicast network traffic, a core edge node advertises a UR label on a per-EVI basis, and can do so upon assignment of the EVI. For BUM network traffic, a core edge node advertises a BR label on a per-ESI basis within the EVI, and can do so upon attachment of the ES to the EVI. Further still, in embodiments such as those described herein, such core edge nodes advertise these redirect labels without regard to the DF (or non-DF) state of their respective links. Each core edge node, having received such redirect labels from its peer core edge node(s), stores this information, along with information identifying the core edge node sending the information, for use in the event of a failure (740). Local edge node configuration process 725 then concludes.

Figure 8A:
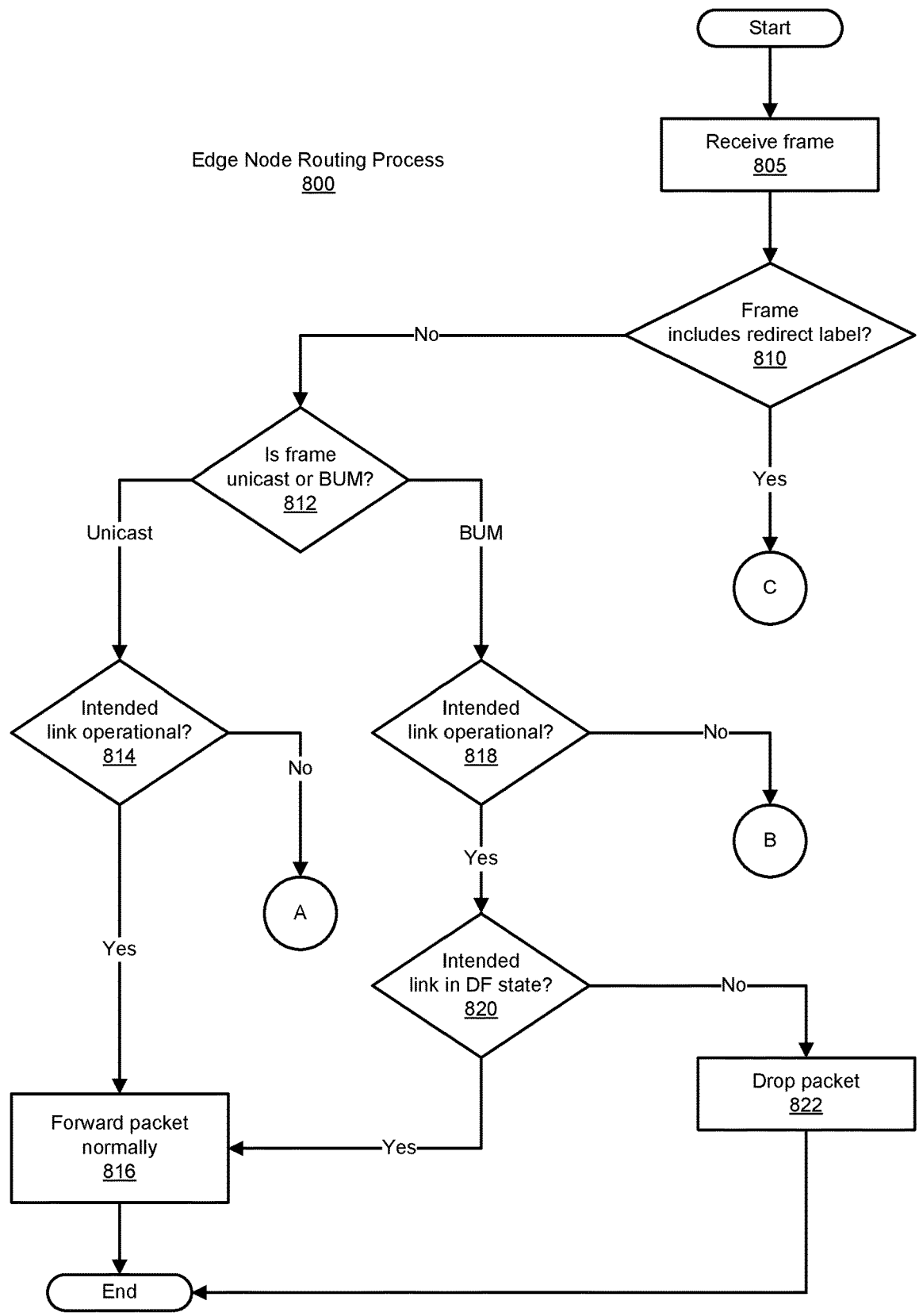
FIGS. 8A, 8B, 8C, and 8D are simplified flow diagrams illustrating examples of various portions of an edge node routing process, according to one embodiment.

FIG. 8A is a simplified flow diagram illustrating an example of an edge node routing process, according to one embodiment. FIG. 8A thus depicts an edge node routing process 800. It will be appreciated that edge node routing process 800 is constructed such that its operations can be carried out, for example, by each of the edge nodes of the redundancy group in question (e.g., provider edge nodes 460 and 465). Further, edge node routing process 800, in certain embodiments, provides for the forwarding of a frame by a given edge node to another (peer) edge node in the redundancy group, as well as the receipt thereof, in the event of a failure.

In the embodiment presented in FIG. 8A, edge node routing process 800 begins with the receipt of a frame (e.g., from a core node within a core network, such as remote provider edge node 370 of provider core network 305, or another core edge node, such as one of provider edge nodes 360 or 365), that includes a packet that is to be forwarded into, for example, an access network such as access network 310, and ultimately, transported to its intended CE device (e.g., customer edge node 330 or a customer edge device communicatively coupled thereto) (805). An example of the first such frame is MPLS frame 530A, in FIG. 5. Edge node routing process 800 also provides for the receipt of a frame from another (peer) edge node that includes a redirect label such as a UR label or BR label. An example of the second such frame is MPLS frame 530B, in FIG. 5.

Upon receipt of a frame, edge node routing process 800 makes a determination as to whether the frame includes such a redirect label (810). If the frame in question does not include a redirect label, a determination is made as to the frame type of the frame received; that is, whether the frame is a unicast frame or a BUM frame (812). If the frame in question is a unicast frame, a determination is then made as to whether the link by which the packet is to be forwarded (e.g., such as one of links 380, 381, 382, or 383) is operational (814). If the intended link is not operational (e.g., the link, port, or other hardware or software component along the intended or potential network communication path has experienced a detectable failure, fault, blocking, topology change, or other such event), the frame is processed according to the portion of edge node routing process 800 depicted in FIG. 8B, and described subsequently in connection therewith (by way of connector "A"). However, if the frame is determined to be a unicast frame and the intended link is operational, the packet in question is forwarded normally (816). Edge node routing process 800 then concludes for the frame in question.

Returning to the frame type determination noted above (812), the frame in question is determined to be a BUM frame, a determination is again made as to whether the intended link is operational (818). If the intended link is not operational, the frame is processed according to the portion of edge node routing process 800 depicted in FIG. 8C, and described subsequently in connection therewith (by way of connector "B"). However, if the frame is determined to be a BUM frame, a determination is made as to whether the intended link is in the DF state (820). If the intended link is in the DF state, the packet in question is forwarded towards its intended destination (816). Alternatively, if the intended link is not the DF state (the intended link is in the non-DF state), edge node routing process 800 blocks the packet from being forwarded (and so, drops the packet) (822). Edge node routing process 800 then concludes for the frame in question.

Returning to the determination as to whether the frame includes the aforementioned redirect label (810), if the frame in question includes a redirect label (e.g., a UR or BR label), the frame is processed according to the portion of edge node routing process 800 depicted in FIG. 8D, and described subsequently in connection therewith (by way of connector "C").

Figure 8B:
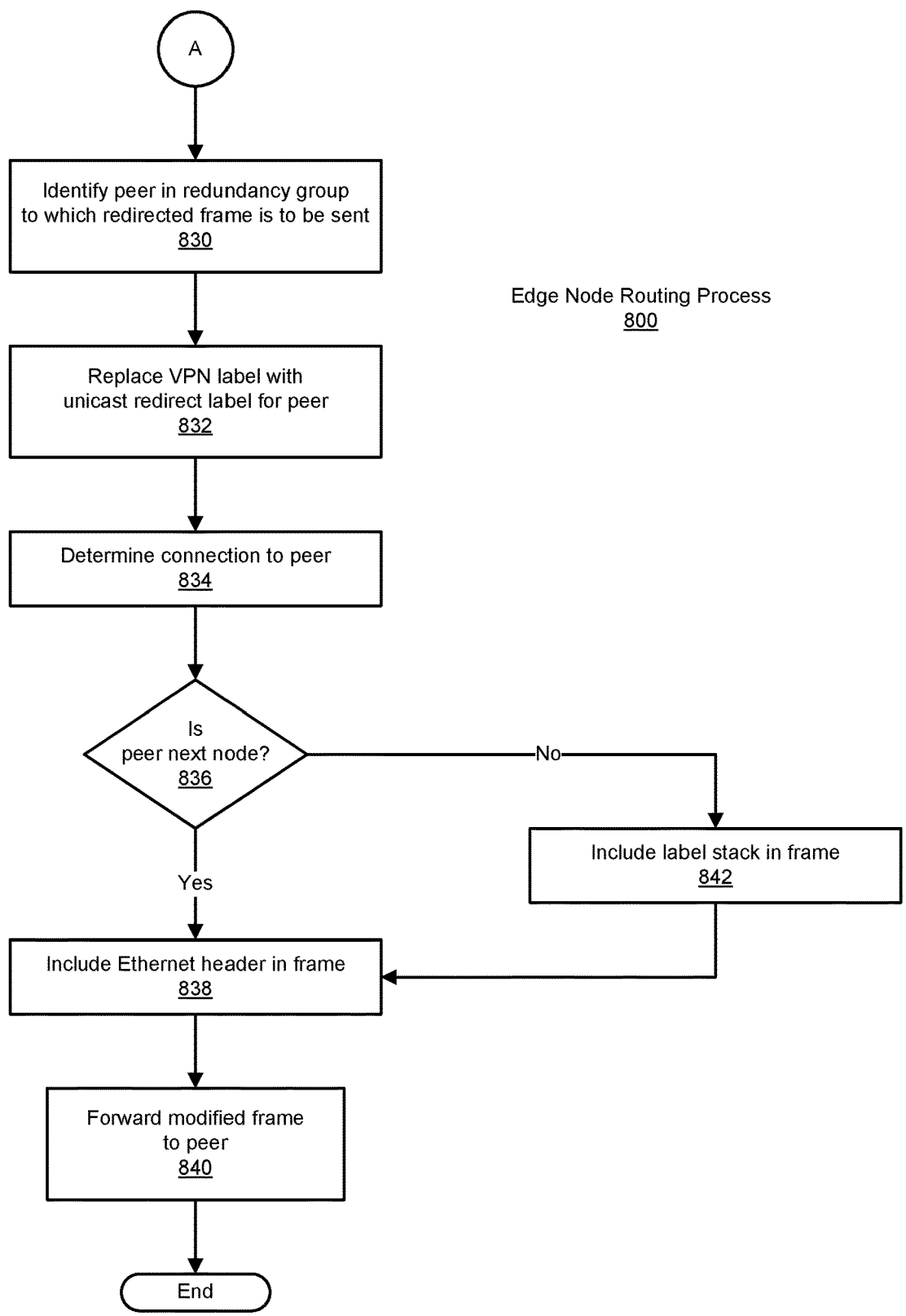

FIG. 8B is also a simplified flow diagram illustrating an example of another portion of the edge node routing process described in connection with FIG. 8A, according to one embodiment. FIG. 8B thus depicts another portion of edge node routing process 800, starting with the connector "A" noted in connection with FIG. 8A. As was also noted, connector "A" is encountered in edge node routing process 800 when a unicast frame's intended link is not operational (814). In such a scenario, the edge node in question identifies a peer edge node in the given redundancy group, to which the redirected frame is to be sent (830). Next, edge node routing process 800 replaces the frame's VPN label with the unicast redirect (UR) label for the peer edge node identified (832). The edge node's connection to its peer is then determined (834). A determination is then made as to whether the edge node's peer is a next node to the given edge node (836). Generally, the edge node's peer is a next node to the given edge node if a label stack is not needed to forward the frame (e.g., as a unicast frame) through the core network to the peer (e.g., as by a direct connection between the given edge node and its peer). If the peer is a next node to the edge node, an appropriate header (e.g., an Ethernet header) is included in the frame (838), and the modified frame is forwarded to the peer (840). Edge node routing process 800 then concludes for the frame in question.

Alternatively, if the edge node's peer is not a next node to the edge node (836), edge node routing process 800 proceeds with the inclusion of a label stack in the frame in question (842). As before, an appropriate header (e.g., an Ethernet header) is included in the frame (838), and the modified frame is forwarded to the peer (840). Edge node routing process 800 then concludes for the frame in question.

Figure 8C:
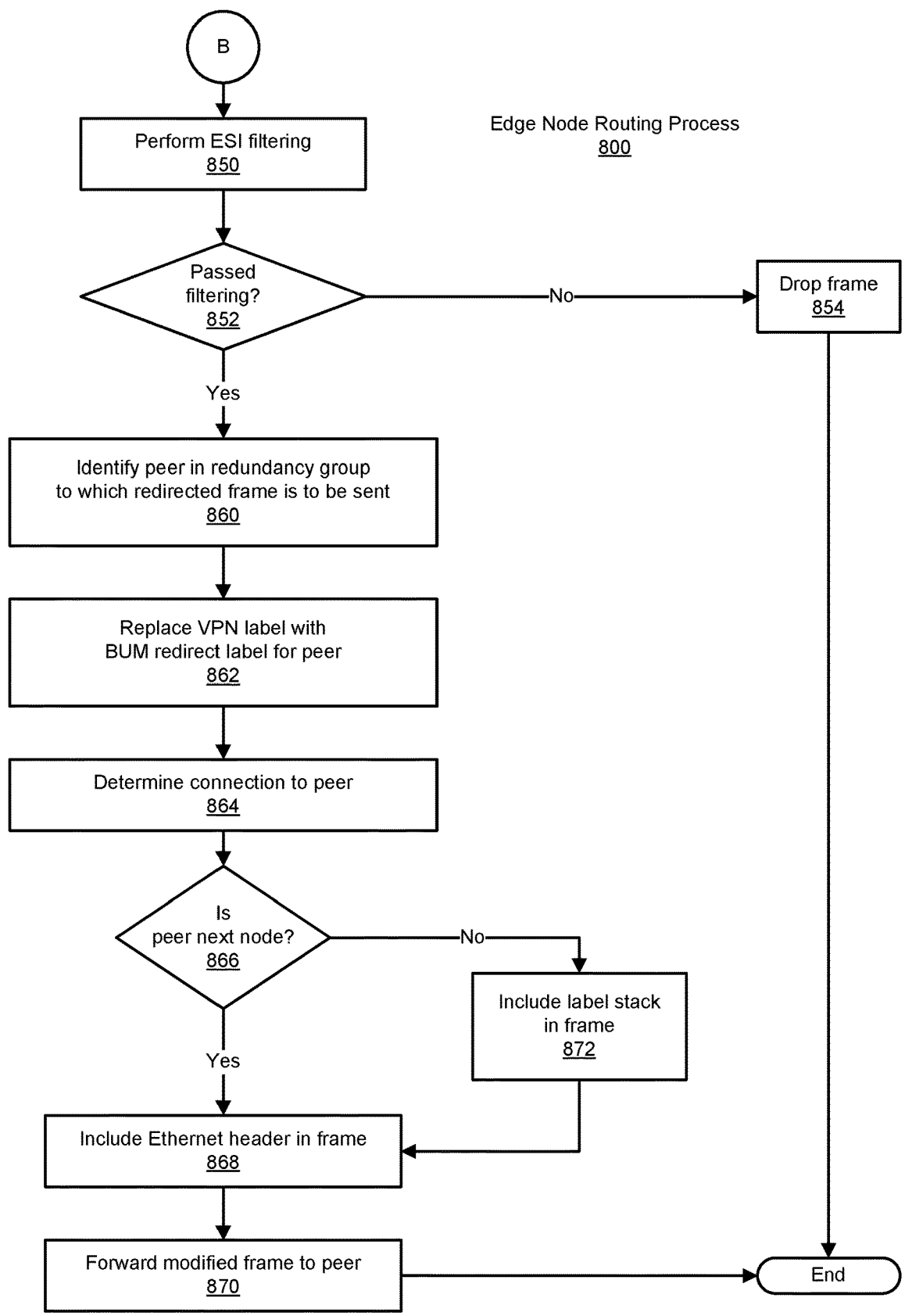

FIG. 8C is also a simplified flow diagram illustrating an example of still another portion of the edge node routing process described in connection with FIG. 8A, according to one embodiment. FIG. 8C thus depicts another portion of edge node routing process 800, starting with the connector "B" noted in connection with FIG. 8A. As was also noted, connector "B" is encountered in edge node routing process 800 when a BUM frame's intended link is not operational (814). In such a scenario, edge node routing process 800 performs filtering (e.g., ESI filtering) (850). A determination is then made as to whether the frame in question passed the filtering performed (852). If the frame in question does not pass this filtering process, the frame is dropped (854). Edge node routing process 800 then concludes for the frame in question.

However, if the frame in question passes such filtering, edge node routing process 800 identifies a peer in the given redundancy group, to which the redirected frame is to be sent (860), and then replaces the frame's VPN label with the BUM redirect (BR) label for the peer edge node identified (862). The edge node's connection to its peer is then determined (864). A determination is then made as to whether the edge node's peer is a next node to the given edge node (866). As noted, the edge node's peer is a next node to the given edge node if a label stack is not needed to forward the frame (e.g., as a unicast frame) through the core network to the peer (e.g., as by a direct connection between the given edge node and its peer). If the peer is a next node to the edge node, an appropriate header (e.g., an Ethernet header) is included in the frame (868), and the modified frame is forwarded to the peer (870). Edge node routing process 800 then concludes for the frame in question.

Alternatively, if the edge node's peer is not a next node to the edge node (866), edge node routing process 800 proceeds with the inclusion of a label stack in the frame in question (872). As before, an appropriate header (e.g., an Ethernet header) is included in the frame (868), and the modified frame is forwarded to the peer (870). Edge node routing process 800 then concludes for the frame in question.

Figure 8D:
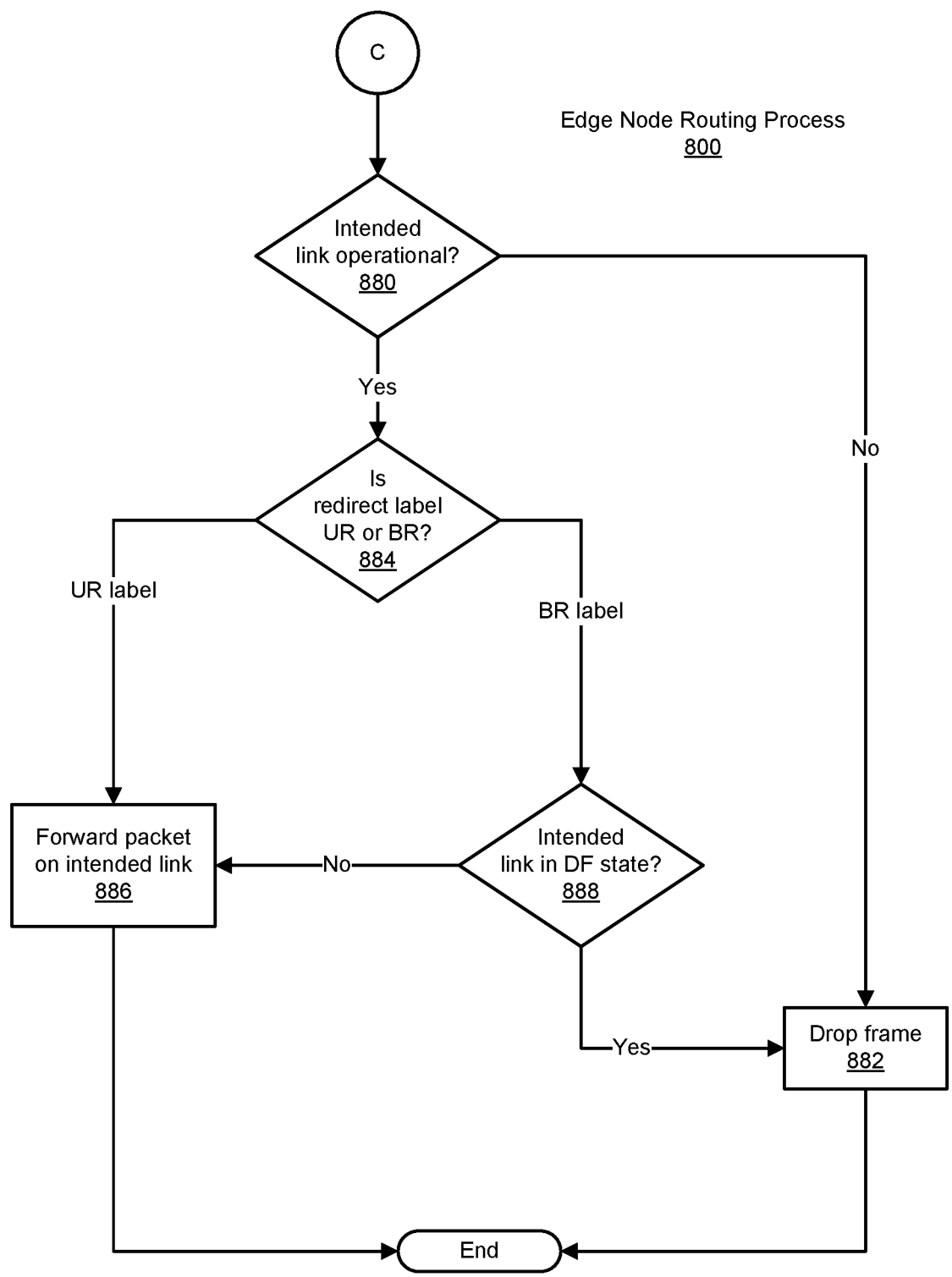

FIG. 8D is also a simplified flow diagram illustrating an example of yet another portion of the edge node routing process described in connection with FIG. 8A, according to one embodiment. FIG. 8D thus depicts another portion of edge node routing process 800, starting with the connector "C" noted in connection with FIG. 8A. As was also noted, connector "C" is encountered in edge node routing process 800 when a received frame includes a redirect label (810). In such a scenario, edge node routing process 800 determines whether the intended link is operational (880). If the intended link is not operational, edge node routing process 800 proceeds with dropping the frame in question (and so blocking the packet) (882). As will be appreciated in light of the present disclosure, in so doing, such an embodiment provides functionality referred to as a loop-free alternate (LFA) path, that being an approach that avoids the creation of loops (e.g., as by preventing the forwarding of one or more frames that will simply return to their point of origination). In so doing, edge node routing process 800 prevents the "ping-ponging" of frames between the nodes of the redundancy group. Edge node routing process 800 then concludes for the frame in question.

Alternatively, if the intended link is operational, a determination is made as to whether the frame's redirect label is a UR label or a BR label (884). If the redirect label is a UR label, the packet in question is forwarded on the intended link (and so, towards its intended destination) (886). In such a situation, as will be appreciated in light of the present disclosure, the frame's having a UR label indicates that such forwarding should occur without regard to the state of the intended link (e.g., its being in a DF or non-DF state). Edge node routing process 800 then concludes for the frame in question.

In the alternative, if the intended link is operational (880) and the redirect label is a BR label (884), a determination is made as to the state of the intended link (888). If the intended link is not in the DF state (is in the non-DF state), the packet in question is forwarded on the intended link, bypassing the blocking that would normally occur (886). However, if the intended link is in the DF state, the frame is dropped (thereby blocking the packet in question) (882). The import here is the avoidance of duplicate packets being forwarded. The receipt of a frame including a BR label after the intended link has completed its election to DF could lead to a situation in which a BUM frame, having been flooded by a remote edge node, is received by both an edge node with a failed link (and so having transitioned that link to the non-DF state) and peer edge node (with a link newly-elected to the DF state). In such a scenario, there exists the possibility of the flooded frame being forwarded by the edge node to the peer edge node with a BR label, with the peer edge node also receiving a copy of the flooded frame from the remote edge node. As will be appreciated, to avoid sending both these (duplicate) frames toward their intended destination, the peer edge node drops the copy of flooded frame that includes the BR label. Edge node routing process 800 then concludes for the frame in question.

As will be appreciated in light of the present disclosure, an approach such as that described in connection with edge node routing process 800 can be performed, for a given path, by edge nodes such as those described herein. As will also be appreciated in light of the present disclosure, operations such as those of edge node routing process 800 can be generalized into separate flows, based, for example, on the status of a node. Using such an approach, the given node's status can be used in determining the manner in which a received frame is handled. In this vein, a generic alternative embodiment is described in connection with FIGS. 9A and 9B.

Figure 9A:
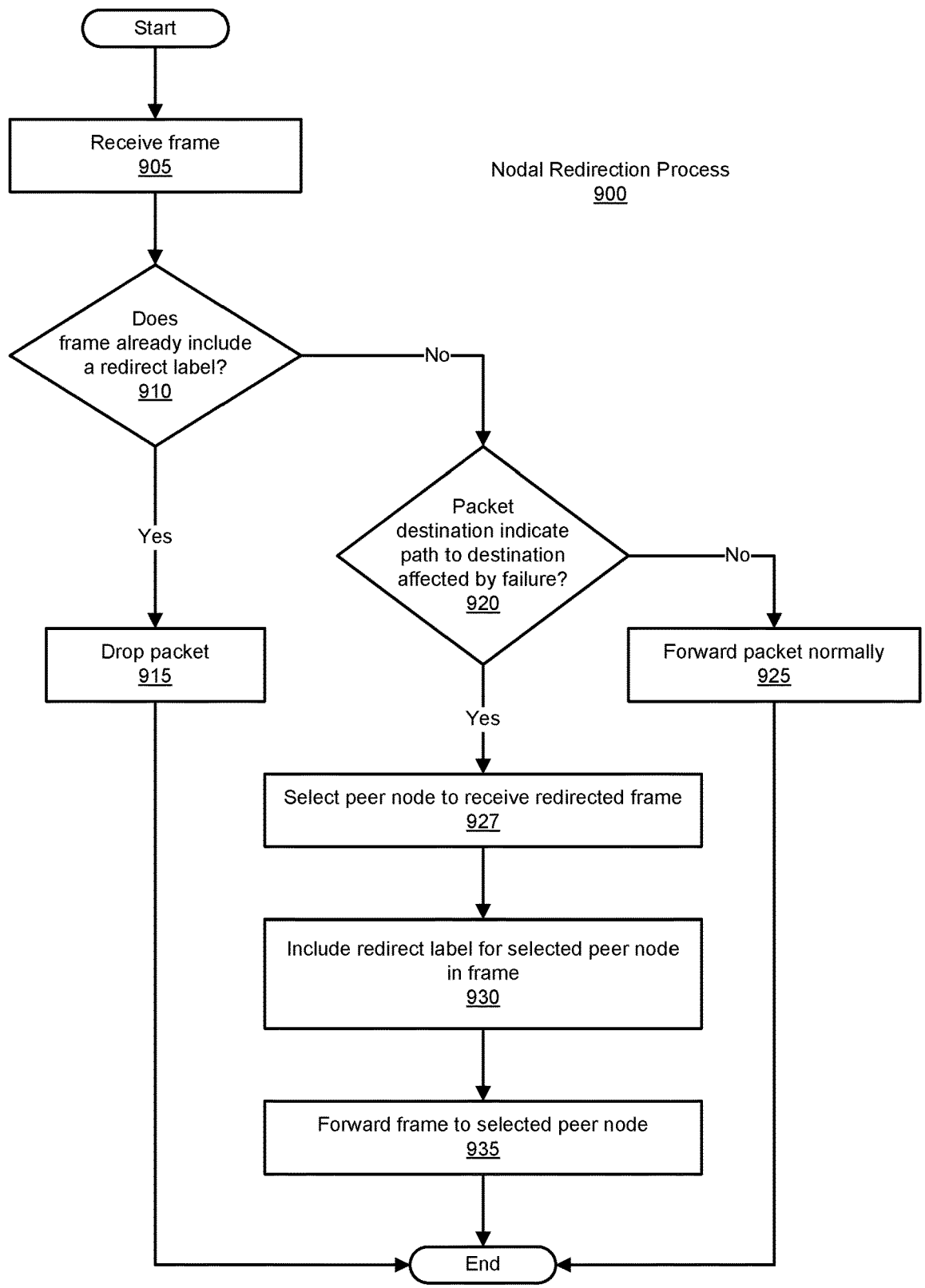
FIG. 9A is a simplified flow diagram illustrating an example of a nodal redirection process, according to one embodiment.

FIG. 9A is a simplified flow diagram illustrating an example of a nodal redirection process, according to one embodiment. FIG. 9A thus depicts a nodal redirection process 900, which assumes the node's state to be that of a node designated to forward a given packet, under normal conditions. Nodal redirection process 900 begins with the receipt of a frame (e.g., from a core node within a core network) at the aforementioned designated node, for forwarding to, for example, an access network, and ultimately, transport to its intended CE device (905). Upon receipt of a frame, a determination is made as part of nodal redirection process 900 as to whether the frame received already includes a redirect label (910). Receipt of a frame that already includes a redirect label can be detected by the node by, for example, determining that the label is one of the redirect labels registered by other nodes in the redundancy group. Alternatively, the designated node can simply determine that the label in question is not a VPN label. In any event, should the given node receive a frame that includes a redirect label, the node can drop (or otherwise block) the packet (915). In so doing, such an approach avoids the creation of loops (e.g., as by preventing the forwarding of one or more frames that will simply return to their point of origination). Nodal redirection process 900 then concludes for the frame in question.

If the frame in question does not already include a redirect label, a determination is made by the node with regard to whether the network communication path indicated by the destination of the packet within the frame has been affected by a failure (920). If the network communication path in question has not been affected by a failure, the packet contained in the frame is forwarded in the normal course (925). Nodal redirection process 900 then concludes for the frame in question.

However, if a failure has been detected in the network communication path in question, the node selects a peer node that is to receive the redirected frame (927), and includes the appropriate redirect label for the selected peer node in the frame (930). An example of such inclusion is the replacement of VPN label 520 in MPLS frame 530A with redirect label 550, to produce MPLS frame 530B. The redirect information having been included in the frame in question, the node forwards this frame to the intended node in the redundancy (935), which, in turn, forwards the packet within, for transport to its ultimate destination. With regard to the selection of the peer node to which to forward the redirected frame, such a decision can be based on a number of factors, including determinations as to network traffic conditions, membership in other redundancy groups, and other such factors. As will be appreciated in light of the present disclosure, such selection is based on peer nodes advertising their redirect labels to the other nodes in the redundancy group (e.g., by way of mechanisms such as those described earlier with regard to gateway protocols). Nodal redirection process 900 then concludes for the frame in question.

At this juncture, it should be noted that, while nodal redirection process 900 describes the forwarding of a frame including a redirect label to a given node, a node executing nodal redirection process 900 can, in fact, forward such a frame to some or all of other nodes in the redundancy group (e.g., as by a process comparable to multicast or broadcast of such information), rather than forwarding the frame including the redirect label to only a particular node in the redundancy group (e.g., as by a process comparable to unicast of such information, as described earlier). In such an approach, the redirected frame includes a redirect label for the chosen pair node, and so can be ignored by other such nodes. In the case in which multiple nodes in the redundancy group receive such a frame, the node(s) receiving such a frame can compare the redirect label thus received with the redirect label provided to the sending node, in order to determine whether the receiving node is the intended recipient of the frame. Further still, a sending node can associate certain network parameters (and their values, such as those used to determine distances, costs, and other metrics associated with the BGP protocol) with each redirect label received from the other nodes in the redundancy group. In so doing, the node sending frames with a redirect label can select among receiving nodes in the redundancy group based on such parameters, and so forward redirect labeled frames to a node in the redundancy group associated with more favorable network parameters.

Figure 9B:
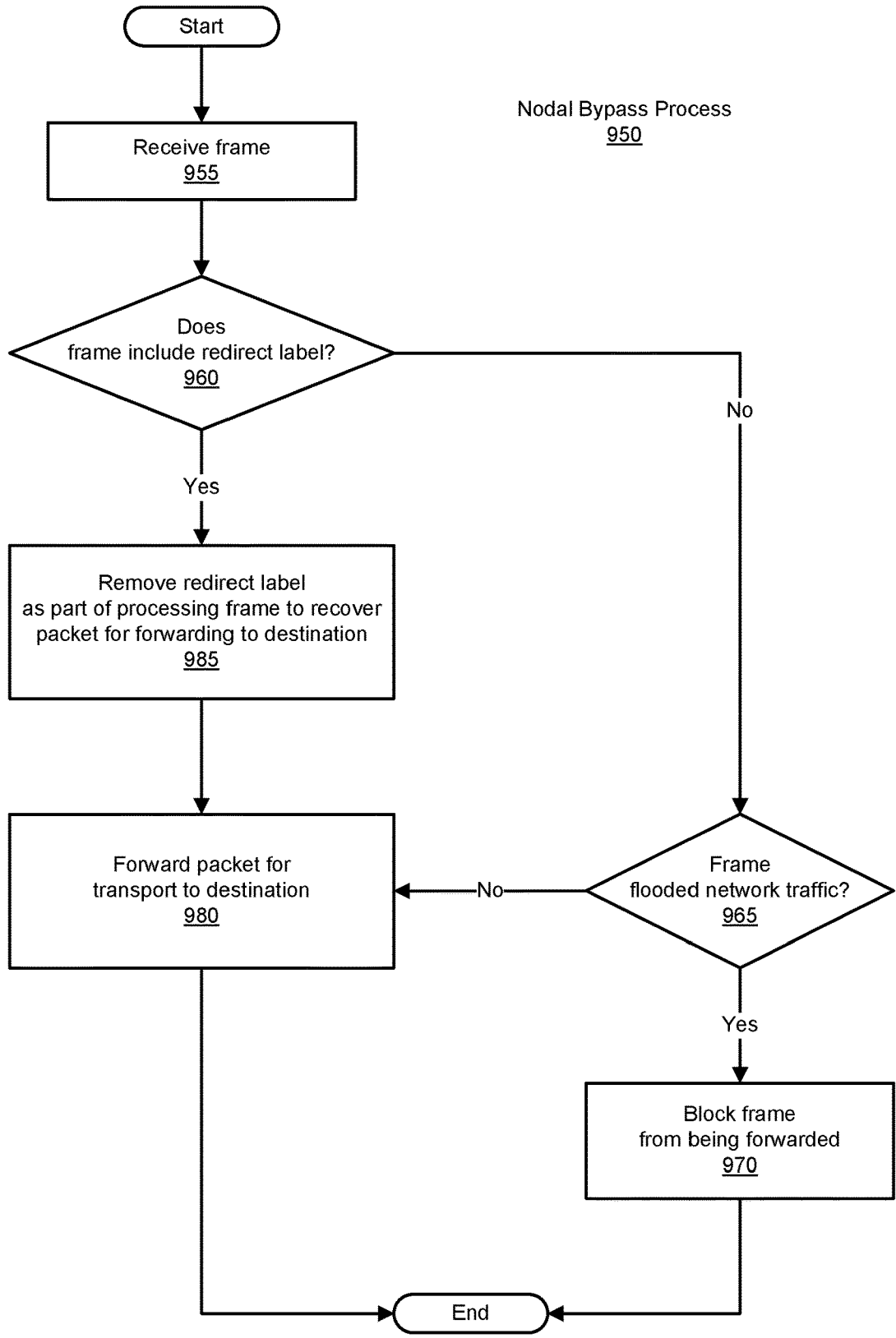
FIG. 9B is a simplified flow diagram illustrating an example of a nodal bypass process, according to one embodiment.

FIG. 9B is a simplified flow diagram illustrating an example of a nodal bypass process, according to one embodiment. FIG. 9B thus depicts a nodal bypass process 950, which assumes the node's state to be that of a node configured to prevent the forwarding of a given packet, under normal conditions. Nodal bypass process 950 begins with the receipt of a frame (955). A determination is made as to whether the frame includes a redirect label (960). If the received frame does not include a redirect label, a determination is made as to whether the frame was received from a remote edge node sending the frame as part of the frame having been flooded by the remote edge node (965). In the case in which the frame does not include a redirect label and was flooded by the remote edge node, the frame is blocked from being forwarded (970). In the manner noted elsewhere herein, such blocking drops the packet in question and thereby prevents duplicate packets from being forwarded. Otherwise, if the frame does not include a redirect label, but was not flooded (and so was forwarded specifically to the node in question), the packet is forwarded for transport to its destination (980). Nodal bypass process 950 then concludes, and the node returns to awaiting the next frame received.

Alternatively, if the frame in question includes a redirect label (960), the frame can be processed by removing the redirect label as part of the processing of the frame to recover the packet for forwarding to its intended destination (985). The packet can then be forwarded for transport to its destination, bypassing any blocking that would normally occur (980). Nodal bypass process 950 then concludes, and the node returns to awaiting the next frame received.

Example Computing Device and Network Environment

As shown above, the systems described herein can be implemented using a variety of computer systems and networks. Examples of such computing and network environments are described below with reference to FIGS. 10 and 11.

Figure 10:
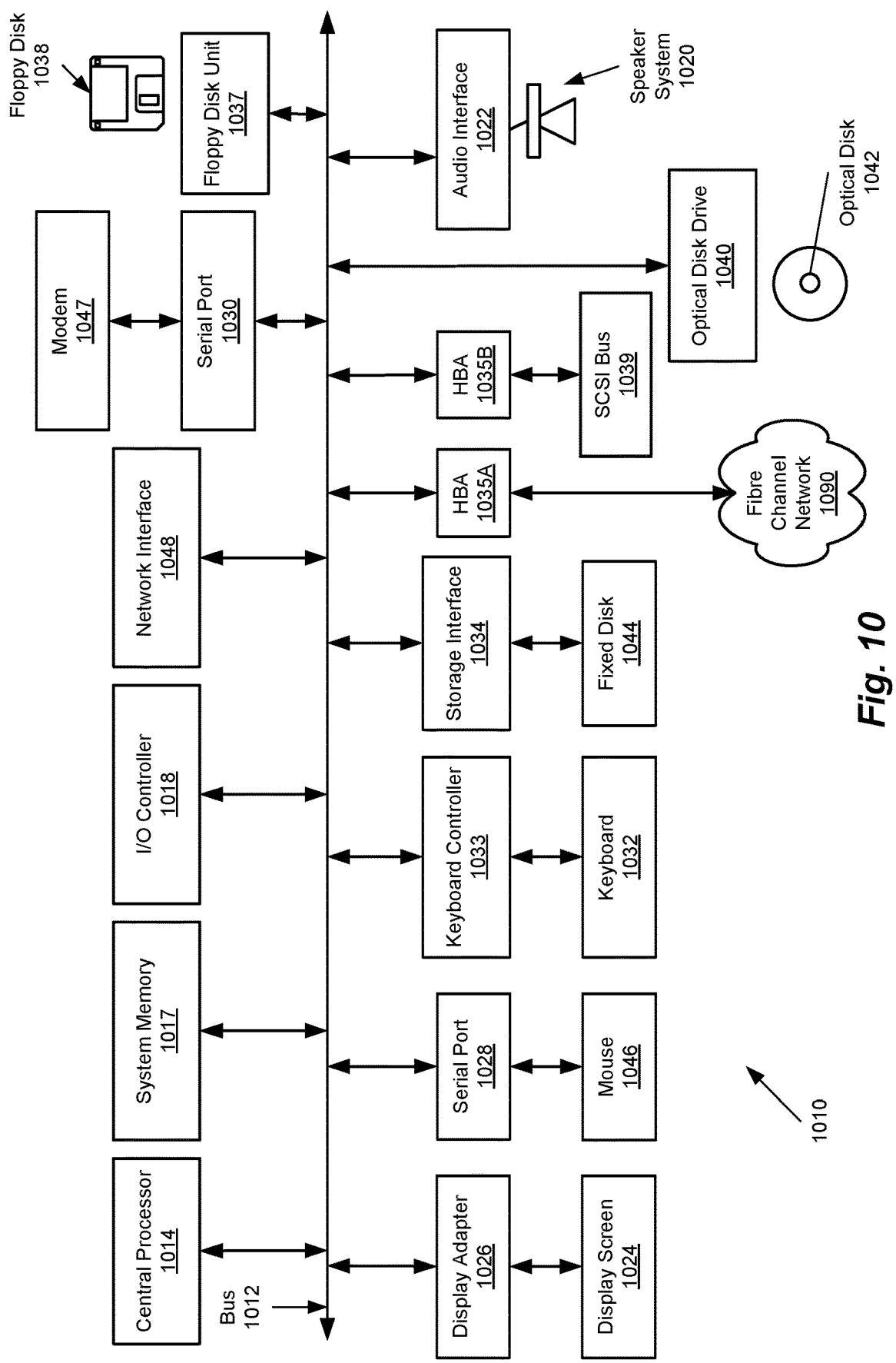
FIG. 10 is a simplified block diagram illustrating components of an example computer system, which can be used in the implementation of embodiments such as those described herein.

FIG. 10 depicts a block diagram of a computer system 1010 suitable for implementing aspects of the systems described herein, and the like. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows a network communication between central processor 1014 and system memory 1017, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1010 are generally stored on and accessed from a computer-readable storage medium, such as a hard disk drive (e.g., fixed disk 1044), an optical drive (e.g., optical drive 1040), a floppy disk unit 1037, or other computer-readable storage medium.

Storage interface 1034, as with the other storage interfaces of computer system 1010, can connect to a standard computer-readable medium for storage and/or retrieval of information, such as a fixed disk drive 1044. Fixed disk drive 1044 may be a part of computer system 1010 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the systems described herein. The devices and subsystems can be interconnected in different ways from that shown in FIG. 10. The operation of a computer system such as that shown in FIG. 10 is readily known in the art and is not discussed in detail in this application. Code to implement the modules of the systems described herein can be stored in computer-readable storage media such as one or more of system memory 1017, fixed disk 1044, optical disk 1042, or floppy disk 1038. The operating system provided on computer system 1010 may be MS-WINDOWS®, UNIX®, Linux®, or other operating system.

Further, and as will be appreciated in light of the present disclosure, each of the operations described herein may be executed by a module (e.g., a software module) or a portion of a module, or a computer system user. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module.

The software modules described herein may be received by a computer system, for example, from computer-readable storage media. Such computer readable storage media may be permanently, removably or remotely coupled to the computer system. Computer-readable storage media may non-exclusively include, for example, any number of the following: magnetic storage media (including disk and tape storage media); optical storage media such as compact disk media (e.g., CD ROM, CD R, etc.) and digital video disk storage media; nonvolatile memory storage memory including semiconductor-based memory units such as FLASH memory, EEPROM, EPROM, ROM or application specific integrated circuits; and volatile storage media (including registers, buffers or caches, main memory, RAM, etc.). In a UNIX-based embodiment, the software modules may be embodied in a file, which may be a device, a terminal, a local or remote file, a socket, or other such element. Other new and various types of computer-readable storage media may also be used to store the software modules discussed herein.

Many other devices or subsystems (not shown) may be connected in a similar manner (e.g., bar code readers, document scanners, digital cameras and so on). Conversely, it is not necessary for all of the devices shown in FIG. 10 to be present to practice the present invention. The devices and subsystems may be interconnected in different ways from that shown in FIG. 10. The operation of a computer system such as that shown in FIG. 10 is readily known in the art and is not discussed in detail in this application. Code to implement the present invention may be stored in computer-readable storage media such as one or more of system memory 1016, fixed disk 1044, CD-ROM 1042, or floppy disk 1038. Additionally, computer system 1010 may be any kind of computing device, and so includes personal data assistants (PDAs), network appliance, X-WINDOWS terminal or other such computing device. Computer system 1010 also supports a number of Internet access tools, including, for example, an HTTP-compliant web browser having a JavaScript interpreter, such as Netscape Navigator®, Microsoft Internet Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
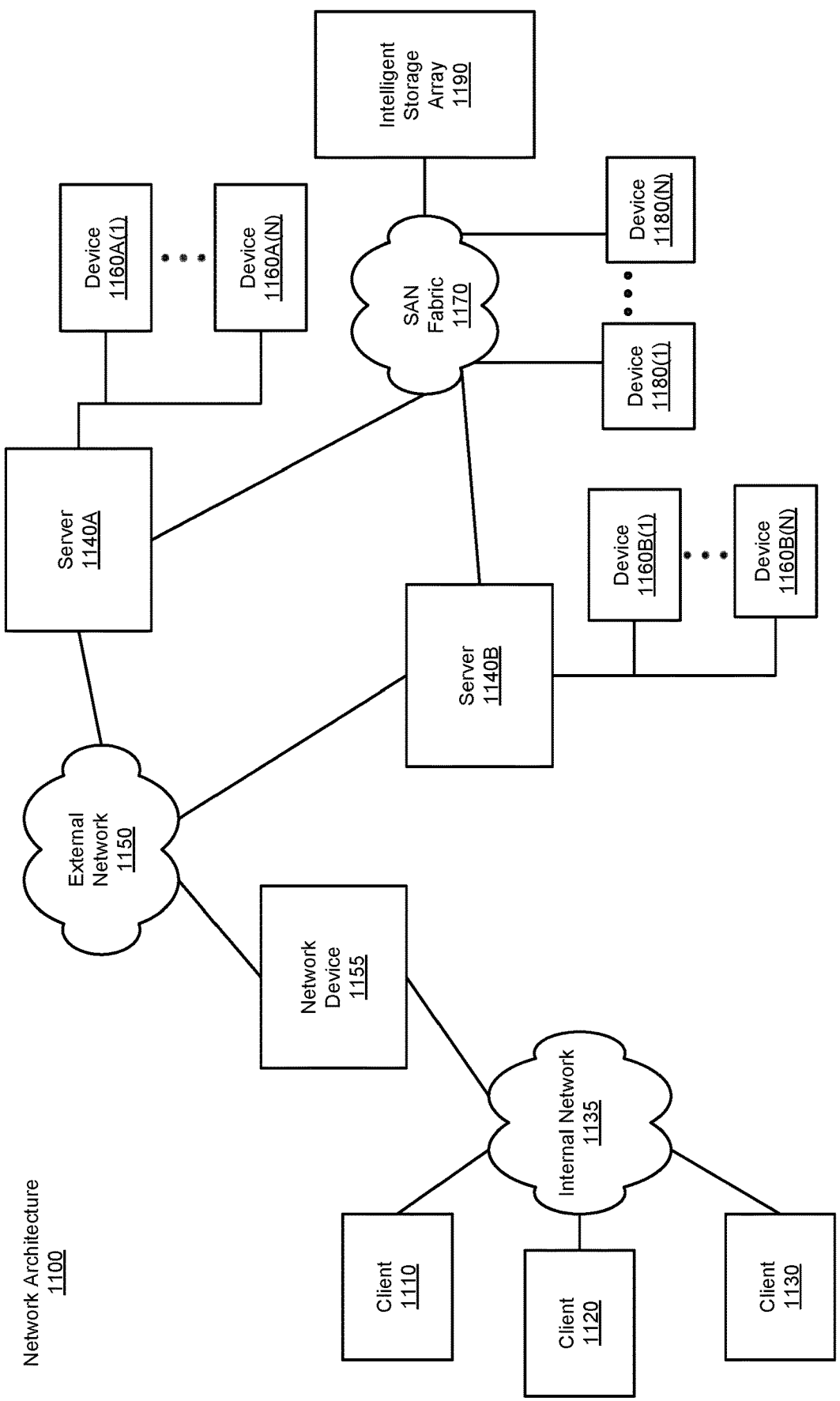
FIG. 11 is a simplified block diagram of a network architecture, in which embodiments such as those described herein can be implemented.

FIG. 11 is a block diagram depicting a network architecture 1100 in which client computer systems 1110, 1120 and 1130 are coupled to one another by an internal network 1135, as well as storage servers 1140A and 1140B (any of which can be implemented using computer system 1110), are coupled to an external network 1150. Internal network1135 and external network 1150 are communicatively coupled to one another, in turn, by a network device 1155, in the manner of network device 110 and/or network device 404.

Storage server 1140A is further depicted as having storage devices 1160A(1)-(N) directly attached, and storage server 1140B is depicted with storage devices 1160B(1)-(N) directly attached. Storage servers 1140A and 1140B are also connected to a SAN fabric 1170, although connection to a storage area network is not required for operation. SAN fabric 1170 supports access to storage devices 1180(1)-(N) by storage servers 1140A and 1140B, and so by client systems 1110, 1120 and 1130 via external network 1150. Intelligent storage array 1190 is also shown as an example of a specific storage device accessible via SAN fabric 1170.

With reference to computer system 1010, modem 1047, network interface 1048 or some other method can be used to provide connectivity from each of client computer systems 1110, 1120 and 1130 to external network 1150. Client systems 1110, 1120 and 1130 are able to access information on storage server 1140A or 1140B using, for example, a web browser or other client software (not shown). Such a client allows client systems 1110, 1120 and 1130 to access data hosted by storage server 1140A or 1140B or one of storage devices 1160A(1)-(N), 1160B(1)-(N), 1180(1)-(N) or intelligent storage array 1190. FIG. 18 depicts the use of a network such as the Internet for exchanging data, but the systems described herein are not limited to the Internet or any particular network-based environment.

The foregoing described embodiments wherein the different components are contained within different other components (e.g., the various elements shown as components of computer system 1010, discussed subsequently). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Example Networking Device

As shown above, the present disclosure can be implemented using a variety of computer systems and networks. An example of one such computing environment is described below with reference to FIG. 12.

Figure 12:
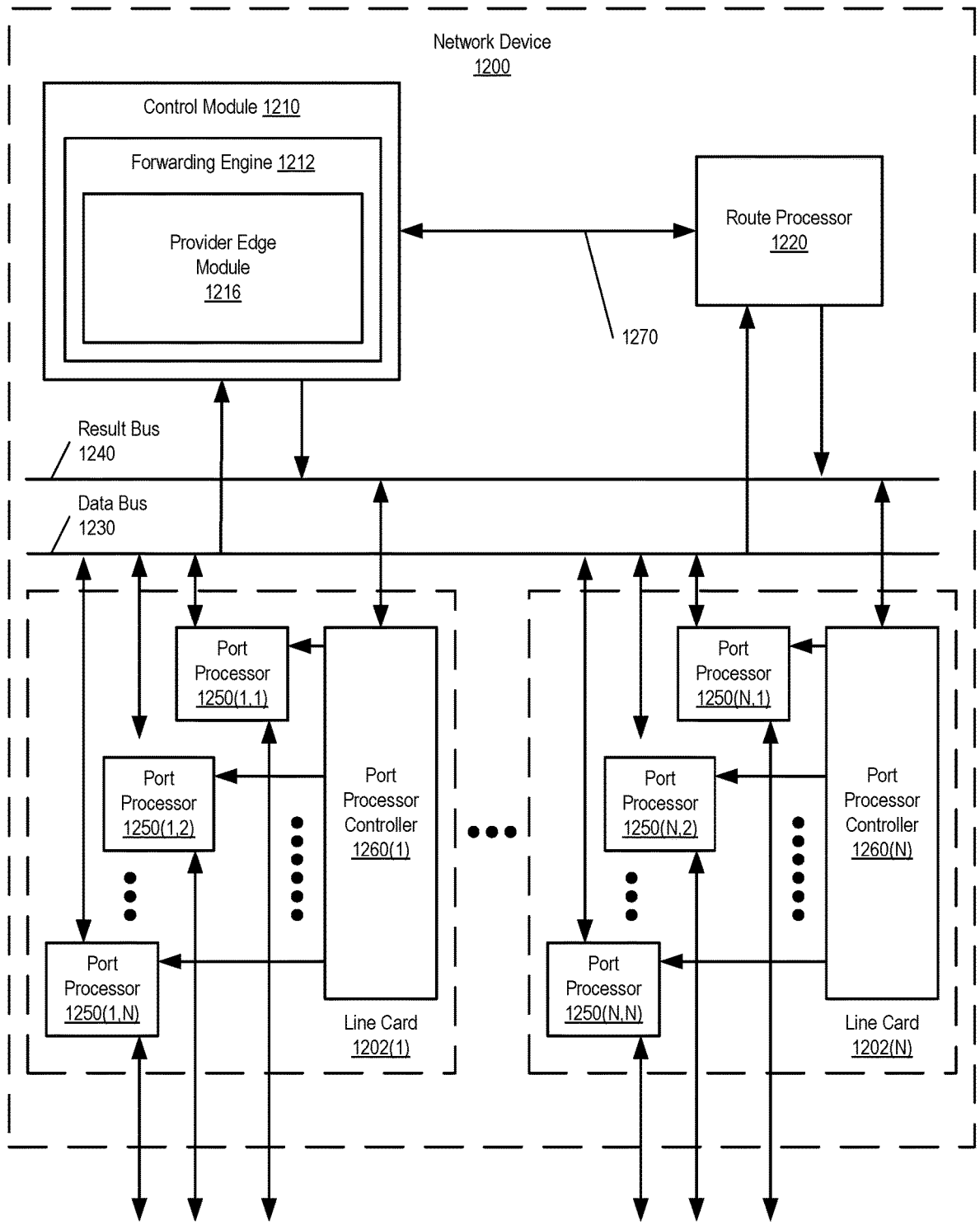
FIG. 12 is a block diagram illustrating components of an example networking device, which can be used in the implementation of embodiments such as those described herein.

FIG. 12 is a block diagram illustrating components of an example networking device 1200, which depicts (at least in part) one configuration of a network device or a network routing element (e.g., a router or similar device). As such, it will be appreciated that networking device 1200 supports certain networking protocols (e.g., such as those described herein, as well as, potentially, other networking protocols), which send information in units of network communications such as packets, datagrams, frames, and the like.

In the present depiction, networking device 1200 includes a number of line cards (line cards 1202(1)-1202(N)) that are communicatively coupled to a control module 1210 (which can be coupled to (or include a forwarding engine, such as forwarding engine 1212). Forwarding engine 1212, in turn, can be configured to effect protocols and methods such as those described herein. To that end, in order to perform operations such as those described elsewhere herein, a core edge node's network protocol module can be implemented (and is depicted in FIG. 12 as a provider edge module 1216). In fact, such a network protocol can implement processes for both local and remote core edge node operations, allowing a core edge node to serve as a local core edge node for certain network paths, while serving as a remote core edge node for others.

Networking device 1200 is also depicted as including a traffic control (or flow control) processor (depicted as a route processor 1220), to which line cards 1202(1)-1202(N) are also coupled. Line 1202(1)-1202(N) are coupled to control module 1210 and route processor 1220 via a data bus 1230 and a result bus 1240. Line cards 1202(1)-(N) include a number of port processors 1250(1,1)-1250(N,N) which are controlled by port processor controllers 1260(1)-1260(N). It will also be noted that control module 1210 and route processor 1220 are not only coupled to one another via data bus 1230 and result bus 1240, but are also communicatively coupled to one another by a communications link 1270. It is noted that in alternative embodiments, each line card can include its own forwarding engine. Further in this regard, forwarding engine 1212 and route processor 1220 can, in certain embodiments, be combined, and so are not necessarily the separate components of network device 1200 depicted in FIG. 12. Further still, forwarding engine 1212 and/or route processor 1220 can include a computer-readable storage medium (memory, (tertiary) content-addressable memory, solid state storage device(s), or the like) in which a network address table (storing network address information), such as a forwarding table, can be maintained by a network device such as network device 1200 implementing a core edge node.

When a packet/frame is received by a network device or network routing element such as networking device 1200, the packet can be identified and analyzed in the following manner. Upon receipt, a packet/frame (or some or all of its control information) is sent from one of the port processors 1250(1,1)-1250(N,N) at which the packet was received to one or more of those devices coupled to data bus 1230 (e.g., others of port processors 1250(1,1)-1250(N,N), a forwarding engine such as forwarding engine 1212, and/or route processor 1220). Handling of the packet/frame can be performed, for example, by a forwarding engine in accordance with the systems and methods disclosed herein. For example, a forwarding engine may determine that the packet/frame should be forwarded to one or more of port processors 1250(1,1)-1250(N,N). This can be accomplished by indicating to a corresponding one(s) of port processor controllers 1260(1)-1260(N) that the copy of the packet/frame held in the given one(s) of port processors 1250(1,1)-1250(N,N) should be forwarded to the appropriate one of port processors 1250(1,1)-1250(N,N).

Networking device 1200 can be used, for example, in the implementation of a network device or a network routing element by way of control module 1210, or in one or more of port processor controllers 1260(1)-1260(N) and/or in route processor 1220, in order to implement the present disclosure. Although not shown, network device 1200 can also be used to implement a routing protocol module (not shown) and/or network reachability protocol module (not shown) in control module 1210, in one of port processor controllers 1260(1)-1260(N), and/or in route processor 1220. In so doing, a core edge node such as one of the core edge nodes described earlier can be implemented.

An incoming packet/frame can be provided to a network device or network routing element via a forwarding engine or port processor of a line card coupled to a port that received the incoming packet/frame. Network device 1200 can be configured to process the incoming packet/frame and to generate one or more outgoing packets/frames, as described throughout this disclosure.

The outgoing packet/frame can be provided to a forwarding engine by a network device or a network routing device, which can determine that the outgoing packet/frame should be forwarded to one or more of port processors 1250(1,1)-1250(N,N) that are configured to transmit the outgoing packet/frame toward the outgoing packet's destination.

As noted with regard to other systems described herein, networking device 1200 includes one or more processors (e.g., microprocessors, PLDs (Programmable Logic Devices), or ASICs (Application Specific Integrated Circuits)) configured to execute program instructions stored in computer readable storage media of various types, including RAM (Random Access Memory), ROM (Read Only Memory), Flash memory, MEMS (Micro Electro-Mechanical Systems) memory, and the like.

Other Embodiments

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:
1. A method comprising:
   receiving a frame at a core edge node, wherein
      the core edge node is a member of a redundancy group,
      the core edge node is a designated forwarder of the redundancy group,
      the frame was sourced by a remote core edge node that is not a member of the redundancy group, and
      the frame comprises
         network address information, and
         a packet;
   determining whether a link, to which the core edge node is communicatively coupled, is affected by a network failure, wherein
      the determining is performed by the core edge node, the link is one of a plurality of links that communicatively couple the core edge node and a customer equipment device, and the network address information indicates that the packet is to be forwarded via the link; and in response to the link being affected by the network failure, generating a modified frame, wherein
the generating comprises including a redirect label in the modified frame, and forwarding the modified frame to another core edge node, wherein
the forwarding is performed by the core edge node,
the another core edge node is another member of the redundancy group,
the another core edge node is a non-designated forwarder of the redundancy group,
the another core edge node and the customer equipment device are communicatively coupled to one another by one or more other links of the plurality of links, and
the link is not one of the one or more other links.

2. The method of claim 1, wherein the generating comprises:
determining whether the frame is a unicast frame; and
in response to the frame being the unicast frame,
performing the including the redirect label in the modified frame by including a unicast redirect label in the modified frame, wherein
the unicast redirect label is associated with the another core edge node.

3. The method of claim 2, wherein the generating further comprises:
determining whether the another core edge node is a next node to the core edge node; and
in response to the another core edge node not being the next node to the core edge node, including a label stack in the modified frame.

4. The method of claim 2, further comprising:
in response to the frame being other than the unicast frame,
performing the including the redirect label in the modified frame by including a broadcast/unknown unicast/multicast (BUM) redirect label in the modified frame.

5. The method of claim 1, wherein the generating comprises:
determining whether the frame is a broadcast/unknown unicast/multicast (BUM) frame; and
in response to the frame being the BUM frame,
performing the including the redirect label in the modified frame by including a BUM redirect label in the modified frame, wherein
the BUM redirect label is associated with the another core edge node.

6. The method of claim 5, further comprising:
in response to the frame being the BUM frame,
performing filtering on the frame,
determining whether the frame passed the filtering, and
in response to the frame passing the filtering,
performing the including a BUM redirect label in the modified frame.

7. The method of claim 6, further comprising:
further in response to the frame passing the filtering,
determining whether the another core edge node is a next node to the core edge node; and in response to the another core edge node not being the next node to the core edge node, including a label stack in the modified frame.

8. The method of claim 6, further comprising:
in response to the frame not passing the filtering, dropping the frame.

9. The method of claim 1, further comprising:
in response to the link not being affected by the network failure,
determining whether the frame is a unicast frame, wherein
the network address information indicates a destination of the packet, and
in response to the frame being the unicast frame, forwarding the packet toward the destination.

10. The method of claim 9, further comprising:
in response to the frame being other than the unicast frame,
determining whether the link is in a designated forwarder state,
in response to the link being the designated forwarder state, forwarding the packet toward the destination, and
in response to the link not being the designated forwarder state, dropping the frame.

11. The method of claim 1, further comprising:
in response to the link not being affected by the network failure,
determining whether the frame is a broadcast/unknown unicast/multicast (BUM) frame, wherein
the network address information indicates a destination of the packet, and
in response to the frame being the BUM frame,
determining whether the link is in a designated forwarder state,
in response to the link being the designated forwarder state, forwarding the packet toward the destination, and
in response to the link not being the designated forwarder state, dropping the frame.

12. The method of claim 1, wherein
the redirect label is configured to cause the another core edge node to perform the forwarding of the packet despite a link via which the packet is to be forwarded being determined to be a non-designated forwarder state, and
the including the redirect label is performed by replacing a virtual private network label in the frame with the redirect label.

13. The method of claim 1, wherein
the redirect label is configured to cause the another core edge node to perform the forwarding of the packet regardless of whether a state of a link via which the packet is to be forwarded being determined to be a designated forwarder state or a non-designated forwarder state, and
the including the redirect label is performed by replacing a virtual private network label in the frame with the redirect label.

14. The method of claim 1, further comprising:
determining whether the frame comprises another redirect label; and
in response to a determination that the frame comprises the another redirect label,
determining whether the link is affected by the network failure, and in response to the link being affected by the network failure, dropping the frame.

15. The method of claim 14, further comprising:
in response to the link not being affected by the network failure,
   determining whether the another redirect label is a unicast redirect label, and
   in response to the another redirect label being the unicast redirect label, forwarding the packet, wherein
      the forwarding the packet forwards the packet toward a destination of the packet.

16. The method of claim 14, further comprising:
further in response to the link not being affected by the network failure,
   determining whether the frame is a broadcast/unknown unicast/multicast (BUM) redirect label, and
   in response to the another redirect label being the BUM redirect label,
      determining whether the link is in a designated forwarder state,
      in response to the link not being in the designated forwarder state, forwarding the packet, wherein
         the forwarding the packet forwards the packet toward a destination of the packet, and
      in response to the link being in the designated forwarder state, dropping the frame.

17. A network device comprising:
one or more processors, wherein
   the network device is a core edge node;
a first network interface, coupled to the one or more processors and configured to be coupled to a link coupled to an access network;
a second network interface, coupled to the one or more processors and configured to be coupled to a core network;
a computer-readable storage medium, coupled to the one or more processors; and
a plurality of instructions, encoded in the computer-readable storage medium and configured to cause the one or more processors to
   receive a frame via the second network interface, wherein
      the core edge node is a member of a redundancy group,
      the core edge node is a designated forwarder of the redundancy group,
      the frame was sourced by a remote core edge node of the core network that is not a member of the redundancy group,
      the frame comprises
         network address information, and
         a packet,
   determine whether the link is affected by a network failure in the access network, wherein
      the plurality of instructions configured to cause the one or more processors to determine are executed by the core edge node,
      the link is one of a plurality of links of the access network that communicatively couple the core edge node and a customer equipment device, and
      the network address information indicates that the packet is to be forwarded via the link, and
   in response to the link being affected by the network failure,
      generate a modified frame, wherein
         the plurality of instructions configured to cause the one or more processors to generate comprises further instructions configured to cause the one or more processors to include a redirect label in the modified frame, and
      forward the modified frame to another core edge node, wherein the plurality of instructions configured to cause the one or more processors to forward are executed by the core edge node,
         the another core edge node is another member of the redundancy group,
         the another core edge node is a non-designated forwarder of the redundancy group,
         the another core edge node and the customer equipment device are communicatively coupled to one another by one or more other links of the plurality of links, and
         the link is not one of the one or more other links.

18. The network device of claim 17, wherein the plurality of instructions configured to cause the one or more processors to generate comprises further instructions configured to cause the one or more processors to:
   determine whether the frame is a unicast frame; and
   in response to a determination that the frame is the unicast frame,
      include a unicast redirect label in the modified frame, wherein
         the unicast redirect label is associated with the another core edge node.

19. The network device of claim 17, wherein the plurality of instructions configured to cause the one or more processors to generate comprises further instructions configured to cause the one or more processors to:
   determine whether the frame is a broadcast/unknown unicast/multicast (BUM) frame; and
   in response to a determination that the frame is the BUM frame,
      include a BUM redirect label in the modified frame, wherein
         the BUM redirect label is associated with the another core edge node.

20. A non-transitory computer-readable storage medium of a network device comprising a plurality of instructions, the plurality of instructions comprising:
   a first set of instructions, executable by a processor of the network device, configured to receive a frame, wherein
      the network device is a core edge node,
      the core edge node is a member of a redundancy group,
      the core edge node is a designated forwarder of the redundancy group,
      the frame was sourced by a remote core edge node that is not a member of the redundancy group, and
      the frame comprises
         network address information, and
         a packet;
   a second set of instructions, executable by the processor, configured to determine whether a link is affected by a network failure, wherein
      the link is one of a plurality of links that communicatively couple the core edge node and a customer equipment device, and
      the network address information indicates that the packet is to be forwarded via the link; and
   a third set of instructions, executable by the processor, configured to in response to, in response to the link being affected by the network failure,
      generate a modified frame, wherein the third set of instructions further comprise
a first subset of instructions, executable by the processor, configured to include a redirect label in the modified frame, and forward the modified frame to another core edge node, wherein
the another core edge node is another member of the redundancy group,
the another core edge node is a non-designated forwarder of the redundancy group,
the another core edge node and the customer equipment device are communicatively coupled to one another by one or more other links of the plurality of links, and
the link is not one of the one or more other links.

* * * * *